(12) United States Patent
Moore et al.

(10) Patent No.: US 11,657,489 B2
(45) Date of Patent: May 23, 2023

(54) SEGMENTATION OF CONTINUOUS DYNAMIC SCANS

(71) Applicant: Omron Corporation, Kyoto (JP)

(72) Inventors: James Moore, Renton, WA (US); Lucas Dziezanowski, Salisbury, NH (US)

(73) Assignee: OMRON CORPORATION, Kyoto (JP)

( * ) Notice: Subject to any disclaimer, the term of this patent is extended or adjusted under 35 U.S.C. 154(b) by 340 days.

(21) Appl. No.: 16/933,951

(22) Filed: Jul. 20, 2020

(65) Prior Publication Data

US 2022/0383483 A1 Dec. 1, 2022

(51) Int. Cl.
*G06K 7/14* (2006.01)
*G06T 7/00* (2017.01)

(52) U.S. Cl.
CPC .......... *G06T 7/0004* (2013.01); *G06K 7/1413* (2013.01); *G06K 7/1447* (2013.01)

(58) Field of Classification Search
CPC .. G06T 7/0004; G06K 7/1413; G06K 7/1447; G06K 9/00; G06F 16/381; G06V 10/22; G06V 10/19
USPC .......................... 382/112, 100; 235/375, 435
See application file for complete search history.

(56) References Cited

U.S. PATENT DOCUMENTS

| | | | |
|---|---|---|---|
| 2009/0202134 A1 | 8/2009 | Kano et al. | |
| 2015/0220811 A1* | 8/2015 | George | G06T 7/337 705/26.61 |
| 2016/0328156 A1* | 11/2016 | Swarbrick | G06F 13/4234 |
| 2019/0333204 A1* | 10/2019 | Uchida | G06V 10/25 |

OTHER PUBLICATIONS

International Search Report and Written Opinion issued in related International Patent Application No. PCT/JP2021/023184 dated Sep. 14, 2021.

* cited by examiner

*Primary Examiner* — Edwyn Labaze
(74) *Attorney, Agent, or Firm* — Morgan, Lewis & Bockius LLP

(57) ABSTRACT

A method of analyzing images is performed at a computer system that is in communication with an image acquisition device having an image sensor. The method includes receiving a reference template that includes a sync region and an inspection region that is located at an offset from the sync region. The method also includes acquiring a continuous sequence of image frames from the image sensor and storing each of the image frames in a buffer within the computer system's memory. The method further includes, for each image frame in the buffer, determining whether the image frame includes a sub-region matching the sync region. The method also includes, in accordance with a determination that the image frame includes a sub-region matching the sync region, capturing an inspection region within the image frame at the offset from the sub-region, and storing the captured inspection region to a non-volatile portion of the memory.

20 Claims, 22 Drawing Sheets

310 sync region 312

SEGMENTATION OF CONTINUOUS DYNAMIC SCANS

TECHNICAL FIELD

The disclosed implementations relate generally to analyzing images and more specifically to systems and methods for analyzing segmented images within a continuous image stream.

BACKGROUND

With the growing number of goods and products being produced and shipped around the world, proper organization and cataloging of such information relies on providing accurate information. In many cases, the information is stored in the form of printed materials, such as barcodes for products, shipping labels, or order confirmations. Inspection and verification of printed materials is thus very important because an error in the printed material may result in product losses and/or reduced efficiency.

SUMMARY

Verification of printed materials requires inspection of high resolution images that are acquired in real time. In many cases, the real-time data acquisition is captured as a continuous stream of images (e.g., a video stream) as the printed materials are output from a printer, such as in a label printing factory line. In many instances, the continuous stream of data does not provide distinguishing features or markers that separate individual printed units from one another. Current methods of identifying and segmenting images of individual printed units from a continuous stream of images requires tight coupling between the printer and the image acquisition system, and utilizes trigger signals sent from the printer to the image acquisition system to identify separate printed units. The tight coupling and signal between the printer and the image acquisition system can be easily interrupted due to errors in signal transmission, signal reception, interrupted wireless connection, or even a loose cable. This results in methods that allow for a small margin of error, which can lead to inconsistent and unreliable results.

Accordingly, there is a need for tools that can reliably and efficiently identify and provide segmented images of printed units for inspection and verification. One solution to the problem is to use feature recognition methods in combination with predefined parameters of the print units. By identifying a sync region that includes features that can be identified using feature recognition methods, and identifying an inspection region that contains portions of the image to be validated, an image analysis system can automatically segment the continuous stream of images into individual images of printed units and store the segmented images for inspection. For a specific print pattern, such as an invoice slip for a company, each invoice slip includes the company name and logo (even if each invoice may include different information, such as client billing information, amounts, and dates). Thus, the company logo may be selected as a sync region so that a computer is configured to look for and identify features of the logo as the data acquisition system provides a dynamic data stream of the printed invoice slips (e.g., a video stream of the printed invoice slips). Each time the computer identifies the logo as being shown in the data stream, the computer automatically identifies the corresponding inspection region relative to the logo (e.g., 10 pixels before the logo and 500 pixels after the logo) and stores an image of the inspection region as a segmented image of an invoice slip. This technique eliminates the need for tight coupling of the timing of a printer output or a printer signal with an image acquisition signal (e.g., acquire an image 10 milliseconds after the printer sends a trigger signal) and reliably produces high resolution images of the printed units for inspection.

In accordance with some implementations, a method of analyzing images executes at a computer system that is in communication with an image acquisition device having an image sensor. The computer system includes a display, one or more processors, and memory. For example, the computer system can be a smart phone, a tablet, a notebook computer, a desktop computer, a server computer, or a system of server computers. The computer system receives a reference template that includes a predefined sync region and a predefined inspection region. The predefined sync region includes one or more distinctive features. The predefined inspection region is located at a predefined offset from the predefined sync region. The image sensor acquires a continuous sequence of image frames and the computer stores each of the image frames in a buffer within the memory. For each image frame in the buffer, the computer system determines whether the respective image frame includes a respective sub-region matching the predefined sync region. In accordance with a determination that the respective image frame includes a respective sub-region matching the predefined sync region, the computer system captures a respective inspection region within the respective image frame at the predefined offset from the respective sub-region, and the computer system stores the captured respective inspection region to a non-volatile portion of the memory of the computer system. The non-volatile portion of the memory is distinct from the buffer.

In some implementations, the computer system also stores a respective identifier corresponding to the captured respective inspection region.

In some implementations, the computer system also stores a sync region size and a sync region location. The sync region location includes a first set of coordinates. The computer system also stores an inspection region size and an inspection region location. The inspection region location includes a second set of coordinates that is distinct (e.g., different from) the first set of coordinates.

In some implementations, the computer system detects a frame that includes the one or more distinctive features.

In some implementations, the predefined sync region and the predefined inspection region are specified by a user.

In some implementations, the predefined inspection region includes the predefined sync region.

In some implementations, the predefined sync region is distinct and separate from the predefined inspection region.

In some implementations, the computer system provides the captured respective inspection region for inspection.

In some implementations, the computer system performs one or more predefined visual tests on the captured respective inspection region to evaluate whether the respective image frame meets a specified quality standard and reports results of the one or more predefined visual tests performed on the captured respective inspection region.

In some implementations, the computer system identifies a feature region for evaluation and determines whether the feature region meets the specified quality standard. The computer system also provides an indication of whether the feature region meets the specified quality standard.

In some implementations, the feature region includes a barcode.

In some implementations, the computer system automatically identifies one or more feature regions and at least one of the one or more feature regions includes a barcode In some implementations, the feature region is a user defined region.

In accordance with some implementations, a method of analyzing images executes at a computer system that is in communication with an image acquisition device having an image sensor. The computer system includes a display, one or more processors, and memory. The computer system receives a first set of coordinates and a set of distinctive features that correspond to a predefined sync region. The computer system also receives a second set of coordinates that correspond to a predefined inspection region. The second set of coordinates is located at a predefined offset from the first set of coordinates. The image sensor acquires a continuous sequence of image frames and the computer stores each of the image frames in a buffer within the memory. For each image frame in the buffer, the computer system determines whether the respective image frame includes a respective sub-region matching the predefined sync region. In accordance with a determination that the respective image frame includes a respective sub-region matching the predefined sync region, the computer system captures a respective inspection region within the respective image frame at the predefined offset from the respective sub-region, and the computer system stores the captured respective inspection region to a non-volatile portion of the memory of the computer system. The non-volatile portion of the memory is distinct from the buffer.

In accordance with some implementations, a method of generating a reference template executes at a computer system having a display, one or more processors, and memory. The computer system displays an image at a user interface of the computer system. The computer system receives, at the user interface, user input defining a sync region within the image. The sync region includes one or more distinctive features. The computer also receives, at the user interface, user input defining an inspection region within the image. The inspection region is located at a predefined offset from the sync region. The computer then stores, at a non-volatile portion of the memory, the image and information regarding the sync region and the inspection region within the image as a reference template.

In some implementations, after displaying the image, the computer system automatically provides a recommended region of the image as the sync region and receives user input accepting the recommended region as the sync region.

In some implementations, the computer system provides the recommended region based on visual analysis of a plurality of sample images and determination that the recommended regions within each of the sample images are substantially the same.

In some implementations, the computer system stores a first set of coordinates and an image of the one or more distinctive features corresponding to the sync region. The computer system also stores a second set of coordinates corresponding to the inspection region. The second set of coordinates are distinct (e.g., different) from the first set of coordinates.

In some implementations, the computer system provides the reference template to another computer system that is distinct and remote from the computer system. The other computer system is in communication with an image acquisition device that has an image sensor.

In some implementations, the computer system is in communication with an image acquisition device having an image sensor and the image is acquired by the image sensor.

Typically, a computer system electronic device includes one or more processors, memory, a display, and one or more programs stored in the memory. The programs are configured for execution by the one or more processors and are configured to perform any of the methods described herein.

In some implementations, a non-transitory computer readable storage medium stores one or more programs configured for execution by a computing device having one or more processors, memory, and a display. The one or more programs are configured to perform any of the methods described herein.

Thus methods and systems are disclosed that efficiently and reliably provide segmented images of printed materials.

Both the foregoing general description and the following detailed description are exemplary and explanatory, and are intended to provide further explanation of the invention as claimed.

BRIEF DESCRIPTION OF THE DRAWINGS

For a better understanding of these systems, methods, and graphical user interfaces, as well as additional systems, methods, and graphical user interfaces that correlate patients with treating clinicians, refer to the Description of Implementations below, in conjunction with the following drawings, in which like reference numerals refer to corresponding parts throughout the figures.

Figure 1A:
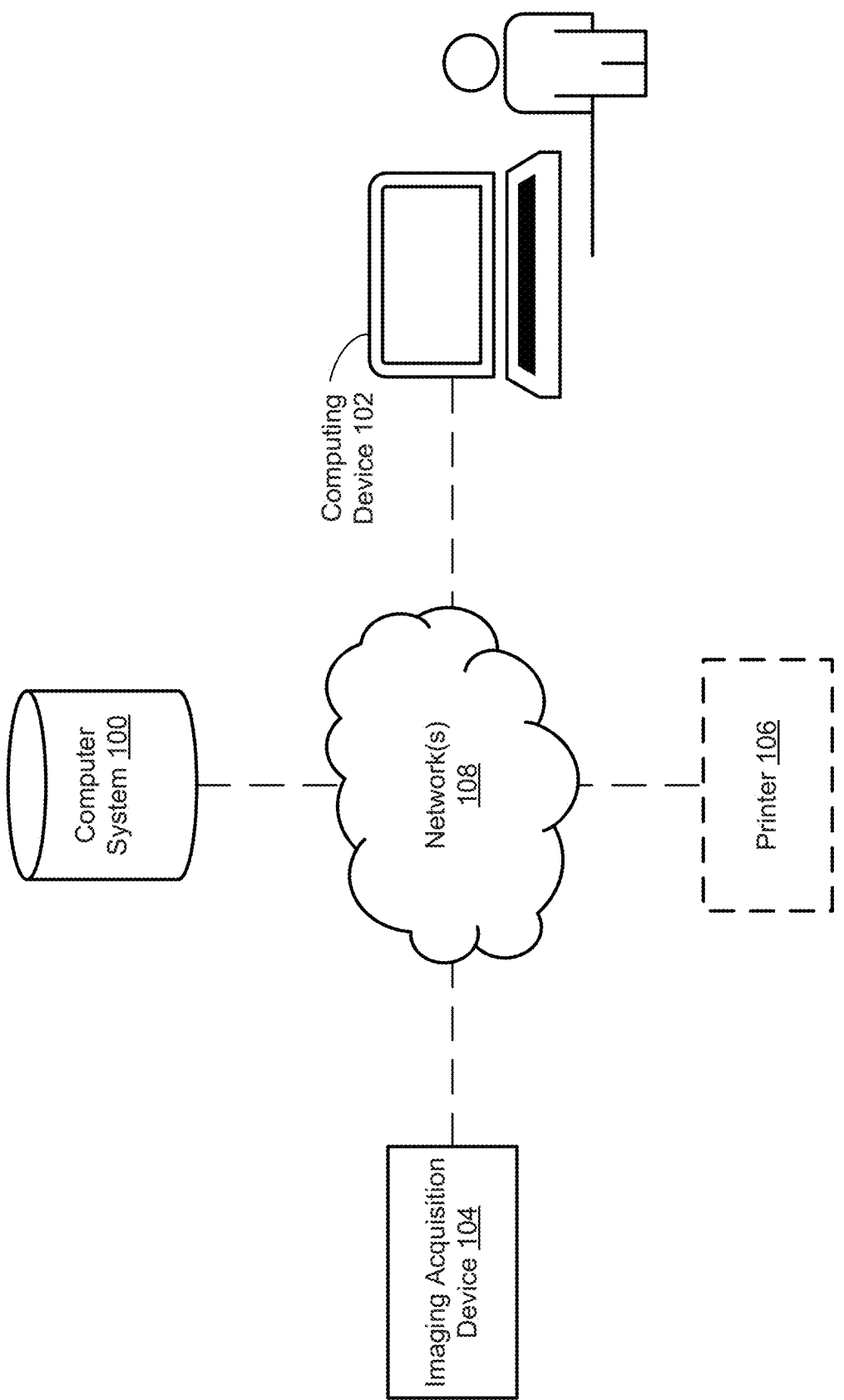
FIG. 1A illustrates a computer system for providing images in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described implementations. The first set of parameters and the second set of parameters are both sets of parameters, but they are not the same set of parameters.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1A illustrates a computer system 100 for providing images in accordance with some implementations. The computer system 100 can be any of a server computer, or a system of server computers, a desktop computer, a notebook computer, a tablet, and a smart phone. In some implementations, the computer system 100 is a server. The description of the computer system 100 as a "server" is intended as a functional description of the devices, systems, processor cores, and/or other components that provide the functionality attributed to the computer system 100. It will be understood that the computer system 100 may be a single server computer, or may be multiple server computers. Moreover, the computer system 100 may be coupled other servers and/or server systems, or other devices, such as other client devices, databases, content delivery networks (e.g., peer-to-peer networks), network caches, and the like. In some implementations, the computer system 100 is implemented by multiple computing devices working together to perform the actions of a server system (e.g., cloud computing).

The computer system 100 is associated with (e.g., in communication with or includes) a computing device 102, such as a desktop computer, a notebook computer, a tablet, or a smart phone. The computer system 100 is also in communication with an image acquisition device 104 (such as a camera, a camera system, also referred to herein as an imaging device 104) that includes an image sensor (e.g., a camera sensor or a charged coupled device (CCD) sensor). In some implementations, the computer system 100 is also in communication with a printer 106 (e.g., a printing system). The image acquisition device 104 may be distinct and separate from any of the computer system 100, the computing device 102, and the printer 106. In some implementations, the image acquisition device 104 functions (e.g., operates) independently of the printer 106. In some implementations, operations of the image acquisition device 104 is not synchronized to operations of the printer 106.

In some implementations, any of the computer system 100, the computing device 102, the image acquisition device 104, and the printer 106 is able to communicate directly with one another (e.g., through a wired connection and/or through a short-range wireless signal, such as those associated with personal-area-network (e.g., BLUETOOTH or BLE) communication technologies, radio-frequency-based near-field communication technologies, or infrared communication technologies) with any of the computing device 102, the image acquisition device 104, and the printer 106. In some implementations, any of the computer system 100, the computing device 102, the image acquisition device 104, and the printer 106 are in communication with one another via one or more networks 108. The one or more networks 108 include public communication networks, private communication networks, or a combination of both public and private communication networks. For example, the one or more networks 108 can include the Internet, other wide area networks (WAN), local area networks (LAN), virtual private networks (VPN), metropolitan area networks (MAN), peer-to-peer networks, and/or ad-hoc connections.

In some implementations, the computing device 102 is a remote device that is located in a different location from the computer system 100 and in communication with the computer system 100 via wireless communications. In some implementations, the computing device 102 local to the computer system or integrated with the computer system. In such cases, the computing device is in communication with the computer system 100 via one or more wired connections. In some implementations, the computing device 102 is a client device that is associated with one or more users.

In some implementations, the computing device 102 sends and receives printer control information through the network(s) 108. For example, the computing device 102 may send one or more files (e.g., documents, images, or printing patterns) for printing to the printer 106. In another example, the computing device 102 may send a signal to begin printing or a signal to halt printing. The computing device 102 can also receive information from the computer system 100 or any other computing devices that are in communication with the computer system 100 or the network(s) 108. For example, the computing device 102 may receive a document for printing from another computing device (e.g., another computer) that is also in communication with the computer system 100 or the network(s) 108. The other computing device may be, for example, another desktop computer that is located remotely from the computer system 100, the computing device 102, and the printer 106.

In some implementations, the computing device 102 receives data (such as dynamic live data) from the imaging acquisition device 104. In some implementations, the computing device 102 includes image segmentation software (such as the Image Segmentation Application 222 in FIG. 2A) that allows a user of the computing device 102 to generate a reference template (such as the reference template 110 in FIG. 1B) used for segmenting the dynamic live data. The image segmentation software may also perform the segmentation and save segmented images to a non-volatile portion of the memory of the computing device 102. In some implementations, the computing device 102 includes inspection software 228 configured to perform inspection tests (such as visual tests) on the segmented images.

Figure 1B:
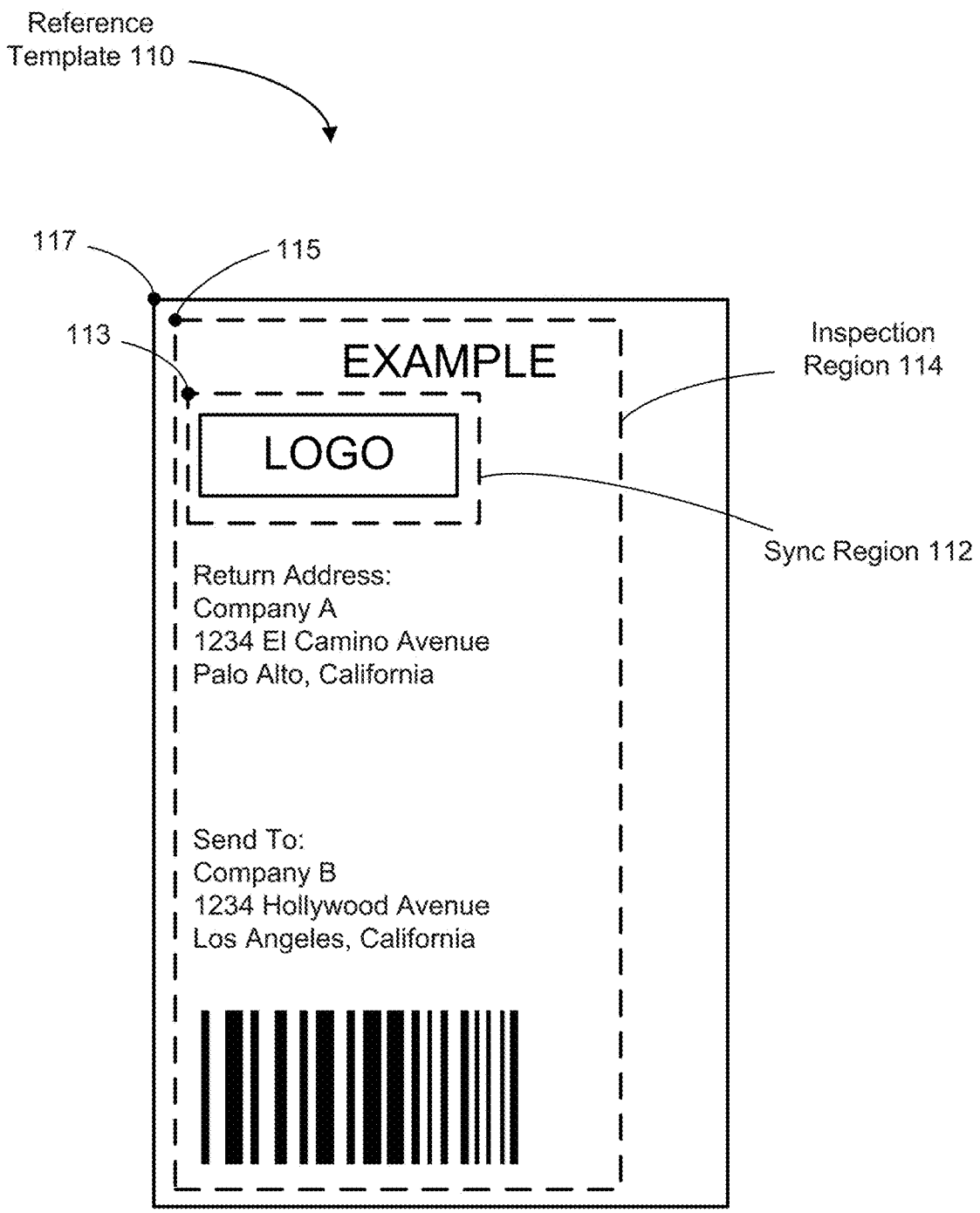
FIG. 1B illustrates an example reference template in accordance with some implementations.

FIG. 1B illustrates an example reference template 110 in accordance with some implementations. A reference template 110 is used as a template for automatic segmentation of dynamic live data (e.g., real-time data, such as a live data stream). The reference template 110 may correspond to any printing materials, such as a poster, a shipping label, a product label, a document, or an image. In some implementations, the reference template includes an image of printed materials that are to be printed (e.g., a set of shipping labels or 100 posters). In the example shown in FIG. 1B, the reference template is corresponds to a shipping label. As shown, the reference template 110 includes information such as a company logo, return address and shipping to address fields, and a barcode.

The reference template 110 includes a sync region 112 and an inspection region 114. The sync region 112 defines a portion of the reference template 110 that includes one or more distinctive features that can be used for identifying the presence of printed material. Thus, the sync region 112 includes distinctive feature(s) that can be easily and accurately identified and the distinctive feature(s) are common to all printed materials in the set of printed materials. For example, a company logo on shipping labels is expected to be the same regardless of the shipping address. Thus, the logo or a portion of the logo would be a good candidate for inclusion in a sync region 112. In this example, the sync region 112 includes the company logo on the shipping label. The inspection region 114 defines a region of interest. In this case, the region of interest is the entire shipping label. For example, a company that sends a printing order for 5,000 printing labels may want each label to be inspected to make sure that the printed text is legible and the barcode includes correct information. Thus, the inspection region 114 for the shipping label may include either the entire shipping label or a portion (e.g., less than all) of the shipping label. In this example, the inspection region 114 includes the entire shipping label. In some implementations, any of the sync region 112 and the inspection region 114 is defined by a user. In some implementations, the computer system 100 may identify (e.g., automatically identify) and suggest (e.g., automatically suggest or automatically recommend) one or more regions of the reference template 110 for inclusion in the sync region 112. In some implementations, the computer system 100 may identify (e.g., automatically identify) and suggest (e.g., automatically suggest or automatically recommend) one or more regions of the reference template 110 for inclusion in the inspection region 114.

In some implementations, the reference template 110, including details regarding the sync region 112 and the inspection region 114, are stored in a non-volatile portion of the memory of the computer system 100 (such as in a non-volatile portion of the memory of a computing device, such as the computing device 102). In some implementations, storing information (e.g., details) regarding the sync region 112 includes storing one or more of: a first set of coordinates 113 corresponding to the sync region 112 (for example, a set of xy coordinates, such as (x, y)=(5.7, 15.4), or a pixel coordinates), a size of the sync region 112 (such as x=+43.1 and y=+24.3 or x=106 pixels and y=29 pixels), and the one or more distinctive features corresponding to the sync region 112 (e.g., an image of the sync region 112 or extracted features of the image shown in the sync region 112). In some implementations, storing information (e.g., details) regarding the inspection region 114 includes storing one or more of: a second set of coordinates 115 that correspond to the inspection region (for example, (x, y)=4.3, 2.4 or pixel coordinates), and a size of the inspection region 114 (such as x=+96.0 and y=+144.9 or x=270 pixels and y=314 pixels), and an offset from the sync region 112 (e.g., the inspection region 114 is offset from the sync region 112 by x=−38.3 and y=+129.5). In some implementations, the first set of coordinates and the second set of coordinates use a same coordinate system and reference a same origin (e.g., point where (x, y)=(0, 0)). In some implementations, the origin 117 is located at the top left corner of the reference template 110.

Once the sync region 112 and the inspection region 114 have been defined in a reference template 110, the reference template 110 can be used as a template for the computer system 100 to automatically segment images of the shipping labels from a dynamic data stream (e.g., a video stream).

Figure 1C:
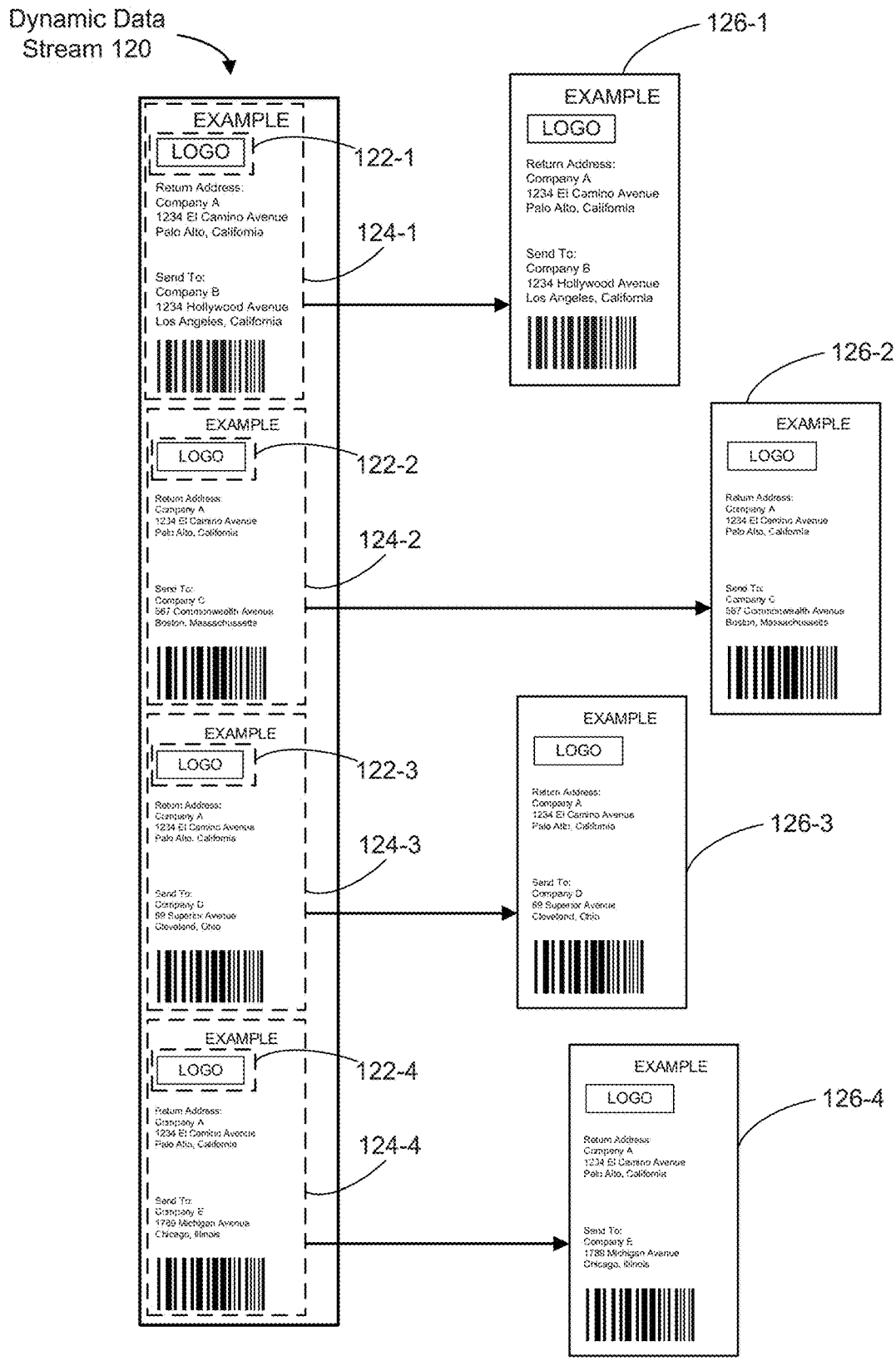
FIG. 1C illustrates segmenting a dynamic data stream into inspection images in accordance with some implementations.

FIG. 1C illustrates segmenting a dynamic data stream 120 into inspection images 126 in accordance with some implementations. As printed materials are produced (e.g., generated or printed), the image acquisition device 104 may acquire a dynamic data stream 120 (e.g., a video stream) that includes a plurality of frames (e.g., image frames or video frames) showing images of the printed materials as they are being printed in real time. The computer system 100 automatically segments the dynamic data stream 120 into individual (e.g., separate and distinct) inspection images 126. In some implementations, the dynamic data stream 120 is written (e.g., recorded or stored) in a buffer within the memory (e.g., a volatile portion of the memory) of the computing system 100 (such as the memory of computing device 102). Because the buffer is finite (e.g., a circular buffer), portions of the buffer are written over as new portions of the image stream arrive. The buffer can be written over for other reasons as well. For example, the buffer may be overwritten when the computing system 100 is powered down (e.g., turned off or unplugged) or when a predetermined period of time elapses.

Following the example described above with respect to FIG. 1B, the dynamic data stream 120 includes images of a plurality of shipping labels that are printed for Company A. In this example, four printing labels are shown. The computer system 100 identifies sub-regions within the dynamic data stream 120 that include features that correspond to (e.g., are similar to, are the same as, or are substantially the same as) the one or more distinctive features in the sync region 112 of the reference template 110. In this case, the one or more distinctive features corresponds to the logo of Company A and thus, four sub-regions 122-1 to 122-4 are identified as having features that correspond to the features of the logo of Company A as shown in the reference template 110. Using the identified sub-regions 122, the computer system 100 identifies inspection regions 124-1 to 124-2 and segments (e.g., extracts) each of the inspection regions 124 into respective inspection images 126. For example, after identifying a frame in the dynamic data stream 120 that includes a sub-region 122-1 corresponding to the sync region 112, the computer system 100 identifies and extracts a frame of the dynamic data stream 120 that includes the inspection region 124-1 as an inspection image 126-1. The computer system 100 stores (e.g., saves) the inspection image 126-1 in a non-volatile portion of its memory so that the inspection image 126-1 can be provided (either in real time or at a later time) even after the information in the buffer has been overwritten. The computer system 100 repeats this process for every identified sub-region (such as the sub-regions 122-2, 122-3, and 122-4) resulting in a plurality of inspection images 126 (e.g., 126-1 to 126-4) being stored in the computer system 100. In some implementations, the process of segmenting the dynamic data stream 120 into inspection images 126 is performed in real-time. In some implementations, the process of segmenting the dynamic data stream 120 into inspection images 126 is performed at some time after the acquisition of the dynamic data stream 120 by the image acquisition device 104. The computing device may perform the segmentation at any point in time before the information (e.g., dynamic data stream 120) to be segmented is overwritten.

Once an inspection region 124 is extracted from the dynamic data stream 120 and stored as an inspection image 126, the inspection image 126 may be provided for inspection.

In some implementations, as shown in FIG. 1C, each printed unit (in this example, a shipping label) includes one or more features that are common to other printed units of the same set (e.g., batch) of printing materials. In other words, there are features, such as the logo and the return address, that are common to all the shipping labels in this set of shipping labels. In some implementations, each individual printed unit (e.g., each shipping label) may include at least one portion that is different from other shipping labels. For example, FIG. 1C shows that each shipping label includes a same logo and a sand return address, and each shipping label has a unique "Send To" address that is different from a "Send To" address shown on other shipping label (e.g., the "Send To" address shown on inspection image 126-1 is different from "Send To" addresses shown on each of inspection images 126-2, 126-3, and 126-4). In some implementations, all the printed units (e.g., shipping labels) of a same set of printing materials are all the same (e.g., includes identical features, do not differ from one another, cannot be distinguished from one another). For example, an order to print 100 parade flyers may include 100 printed units that are all identical.

Figure 1D:
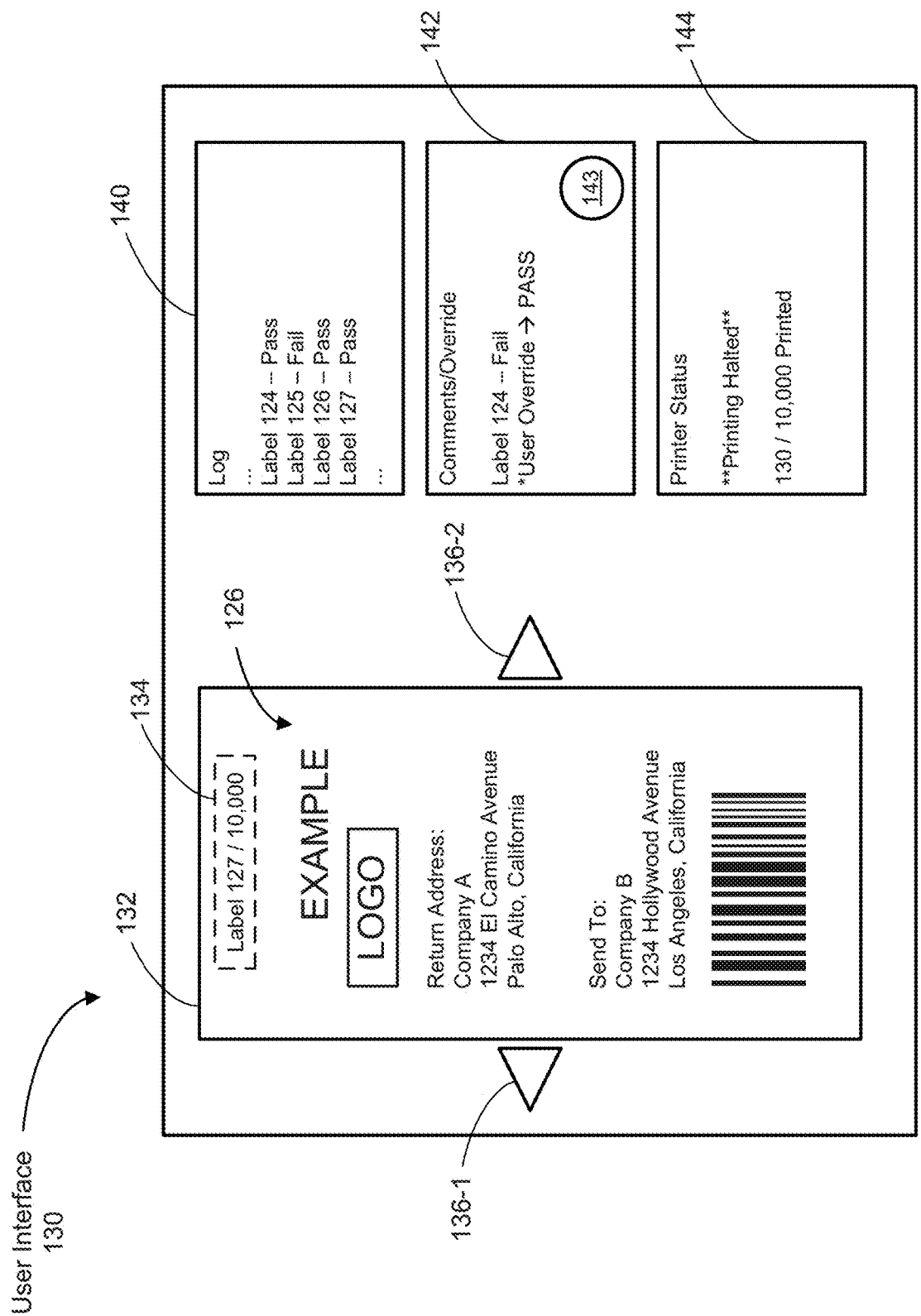
FIG. 1D illustrates providing an inspection image in accordance with some implementations.

FIG. 1D illustrates providing an inspection image 126-1 in accordance with some implementations. Inspection images 126 that are stored (e.g., stored in the non-volatile portion of the memory of computing device 100) may be provided for inspection to a computing device, such as computing device 102. In some implementations, the computing device 102 automatically performs one or more inspection tests on the inspection image 126. In some implementations, the inspection process includes displaying the inspection image 126. In some implementations, the inspection process includes displaying the inspection image 126 to a user via a user interface 130 (also referred to herein as a graphical user interface 130) of the computing device 102. In some implementations, the user interface 130 is a user interface for an inspection application (e.g., inspection software).

As shown in FIG. 1D, the user interface 130 includes an image display region 132 for displaying the inspection image 126. In some implementations, the user interface 130 also displays an identifier 134 corresponding to the inspection image 126. In this example, the identifier 134 indicates that the inspection image 126 currently displayed in the image display region 132 corresponds to the 127th shipping label to be printed out of a set of 10,000 shipping labels (e.g., the identifier is "label 127" or "label 127/10,000"). The identifier 134 includes a set of one or more characters that can include an alphanumeric character and/or a symbol. The identifier 134 is unique to the corresponding inspection image 126 such that each inspection image 126 can be identified or distinguished from other inspection images 126 by their respective identifiers 134.

In some implementations, the user interface 130 includes one or more affordances 136-1 and 136-2 for switching between inspection images 126 in the image display region 132. For example, in response to a user selection of the affordance 136-1, the image display region 132 displays a previous inspection image 126 (e.g., inspection image 126/10,000). In another example, in response to a user selection of the affordance 136-2, the image display region 132 displays a next inspection image 126 (e.g., inspection image 128/10,000).

In some implementations, the user interface 130 also includes an inspection log 140 that is configured to display inspection information corresponding to the inspection images 126. For example, the inspection log 140 may include an indicator of whether a respective inspection image 126 passed or failed an inspection. In this example, the inspection log 140 displays information showing that labels 124, 126, and 127 passed inspection but label 125 failed inspection.

In some implementations, the user interface 130 also includes a comment region 142 that allows users to add comments or override results of inspections that are automatically performed by the computer device. For example, comment region 142 shows that a user has overridden the inspection results for label 124 to indicate that label 124 has passed inspection. The comment region 142 may also include one or more affordances 143 for the user to provide one or more signals or commands to the a printer 106 that is in communication with the computing device. For example, the comment region 142 may include an affordance to halt printing, and/or an affordance to reverse the printer to a specific label and print a strike-through pattern over the specific label to indicate that the specific label has failed inspection and/or should not be used.

In some implementations, the user interface 130 also includes a printer status region 144 that displays information corresponding to a printer 106 that is in communication with the computing device. For example, the printer 106 may be in the process of generating (e.g., printing) printed materials, such as shipping labels. In this example, the printer status region 144 shows that 130 shipping labels out of 10,000 have been printed and that the printer 106 is currently halted (e.g., stopped).

Figure 2A:
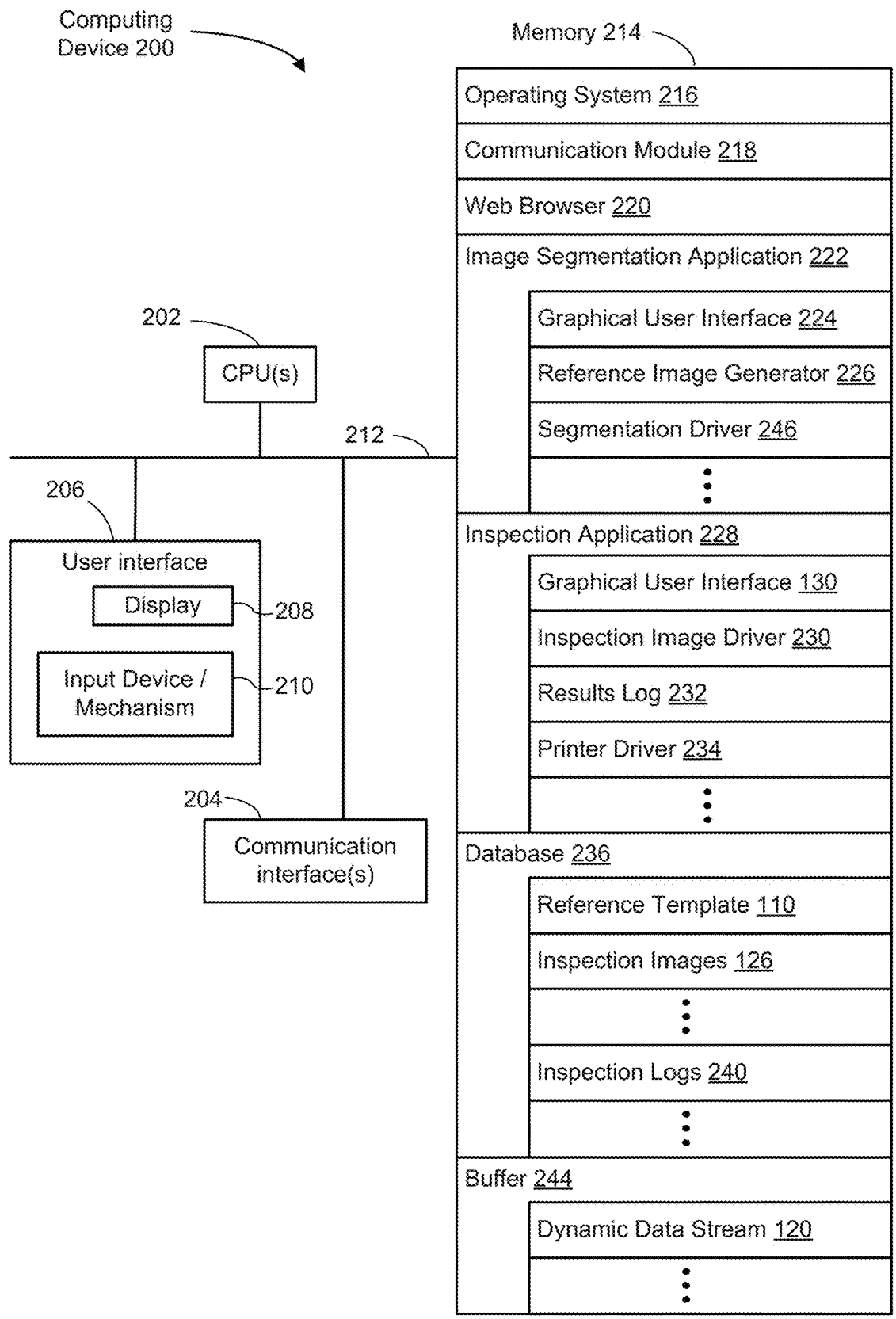
FIG. 2A is a block diagram illustrating a computing device according to some implementations.

FIG. 2A is a block diagram illustrating a computing device 200, corresponding to a computing system 100, which can execute data stream segmentation operations and/or inspection of images in accordance with some implementations. Various examples of the computing device 200 include a desktop computer, a laptop computer, a tablet computer, a server computer, a server system, and other computing devices that have a processor capable of generating segmented images from a dynamic data stream and/or inspect images. The computing device 200 may be a data server that hosts one or more databases (e.g., database of images or videos), models, or modules, or may provide various executable applications or modules. The computing device 200 typically includes one or more processing units (processors or cores) 202, one or more network or other communications interfaces 204, memory 214, and one or more communication buses 212 for interconnecting these components. The communication buses 212 optionally include circuitry (sometimes called a chipset) that interconnects and controls communications between system components. The computing device 200 typically includes a user interface 206. The user interface 206 typically includes a display device 208 (e.g., a screen or monitor). In some implementations, the computing device 200 includes input devices such as a keyboard, mouse, and/or other input buttons 210. Alternatively or in addition, in some implementations, the display device 208 includes a touch-sensitive surface, in which case the display device 208 is a touch-sensitive display. In some implementations, the touch-sensitive surface is configured to detect various swipe gestures (e.g., continuous gestures in vertical and/or horizontal directions) and/or other gestures (e.g., single/double tap). In computing devices that have a touch-sensitive display, a physical keyboard is optional (e.g., a soft keyboard may be displayed when keyboard entry is needed). The user interface 206 also includes an audio output device, such as speakers or an audio output connection connected to speakers, earphones, or headphones. Furthermore, some computing devices 200 use a microphone and voice recognition software to supplement or replace the keyboard. An audio input device (e.g., a microphone) captures audio (e.g., speech from a user).

The memory 214 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 214 includes one or more storage devices remotely located from the processors 202. The memory 214, or alternatively the non-volatile memory devices (e.g., portions) within the memory 214, includes a non-transitory computer-readable storage medium. The memory 214 also includes a volatile memory, such as a buffer 244. In some implementations, the memory 214 or the computer-readable storage medium of the memory 214 stores the following programs, modules, and data structures, or a subset or superset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless), such as the Internet, other wide area networks, local area networks, metropolitan area networks, and so on;
- a web browser 220 (or other application capable of displaying web pages), which enables a user to communicate over a network with remote computers or devices;
- an image segmentation application 222, which includes a graphical user interface 224 that allows a user to navigate the image segmentation application 222, such as accessing, generating, and editing reference templates 110, including defining or accepting recommended sync regions 112 and inspection regions 114. The image segmentation application 222 also includes a reference template generator 226 for generating and editing reference templates 110. The reference template generator 226 may include any of: a sync region driver, an inspection region driver, and a predefined criteria driver for defining and/or suggesting sync regions 112 and inspection regions 114. The image segmentation application 222 also includes a segmentation driver 246 for automatic segmentation of dynamic data streams 120 using information from generated reference templates 110. The segmentation driver 246 may also assign an identifier to each inspection image that is generated (e.g., extracted, segmented) from the dynamic data stream 120;
- an inspection application 228, which includes a graphical user interface 130 that allows users to navigate the inspection application 228, such as view and/or validate (e.g., inspect) inspection images 126. The inspection application 228 includes an inspection image driver 230 for automatically performing one or more inspection tests, a results log 232 for recording results of the one or more inspection tests (e.g., pass/fail), and a printer driver 234 for communicating and sending signals and/or commands to a printer 106 that is in communication with the computing device 200;
- a database 236, which stores information, such as reference templates 110, inspection images 126, and inspection logs 240 (e.g., inspection results); and
- a buffer 244 (e.g., volatile memory) for storing the dynamic data stream 120.

In some implementations, the memory 214 stores metrics and/or scores for validating (e.g., inspecting) inspection images 126. In addition, the memory 214 may store thresholds and other criteria, which are compared against the metrics and/or scores for validating (e.g., inspecting) inspection images 126.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
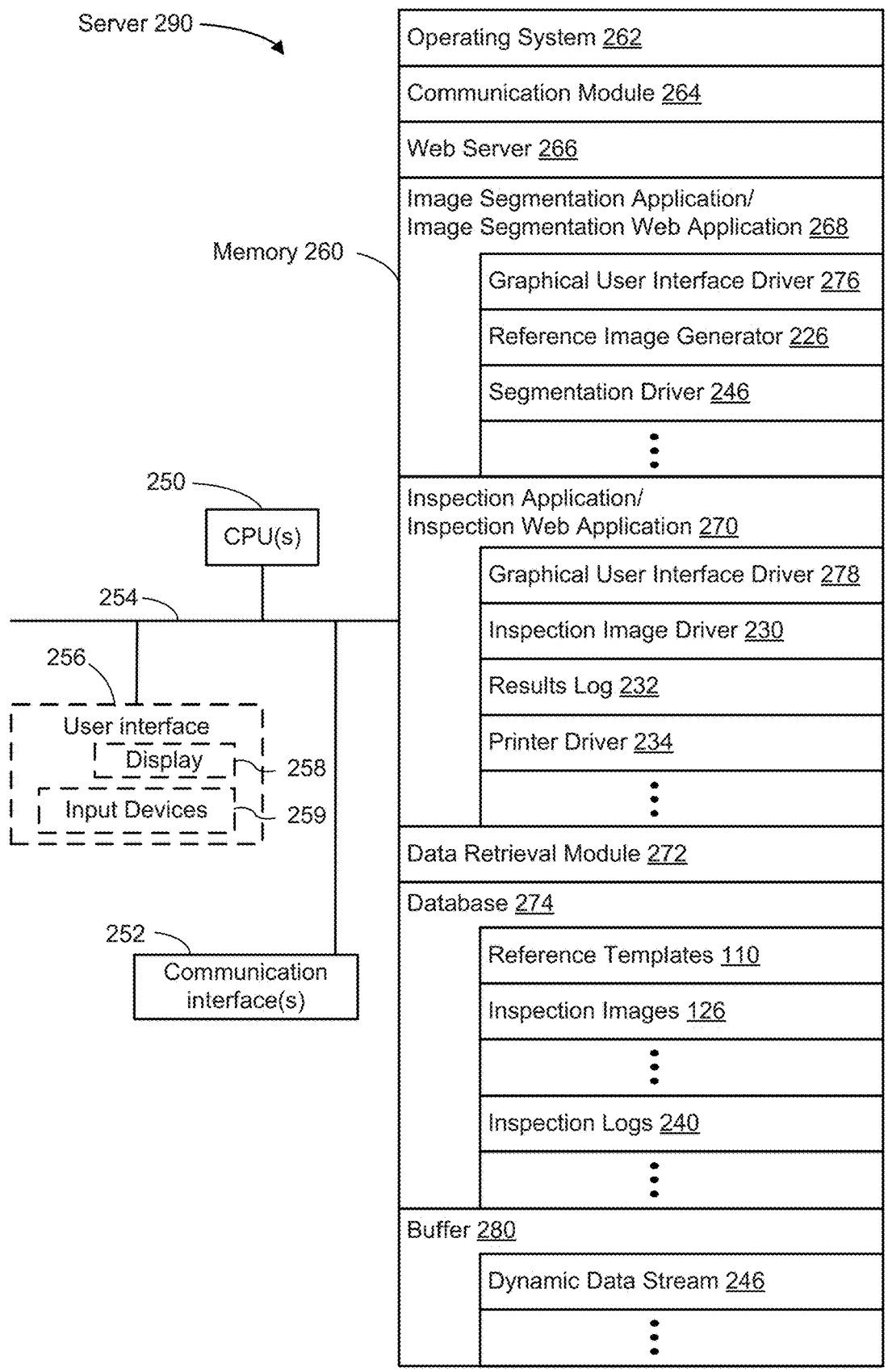
FIG. 2B is a block diagram illustrating a server according to some implementations.

FIG. 2B is a block diagram of a server 290 in accordance with some implementations. A server 290 may host one or more databases 274 or may provide various executable applications or modules. A server 290 typically includes one or more processing units/cores (CPUs) 202, one or more communication interfaces 252, memory 260, and one or more communication buses 254 for interconnecting these components. In some implementations, the server 290 includes a user interface 256, which includes a display 258 and one or more input devices 259, such as a keyboard and a mouse. In some implementations, the communication buses 254 include circuitry (sometimes called a chipset) that interconnects and controls communications between system components.

In some implementations, the memory 260 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 260 includes one or more storage devices remotely located from the CPU(s) 250. The memory 260, or alternatively the non-volatile memory devices (e.g., portions) within the memory 260, includes a non-transitory computer-readable storage medium. The memory 260 also includes a volatile memory, such as a buffer 280. In some implementations, the memory 260, or the computer readable storage medium of the memory 260, stores the following programs, modules, and data structures, or a subset thereof:

- an operating system 262, which includes procedures for handling various basic system services and for performing hardware dependent tasks;
- a network communication module 264, which is used for connecting the server 290 to other computers via the one or more communication network interfaces (wired or wireless) and one or more communication networks, such as the Internet, other wide area networks, local area networks, metropolitan area networks, and so on;
- a web server 266 (such as an HTTP server), which receives web requests from users and responds by providing responsive web pages or other resources;
- an image segmentation application or an image segmentation web application 268, which may be downloaded and executed by a web browser 266 on a user's computing device 200. In general, an image segmentation application 268 has the same functionality as a desktop image segmentation application 222, but provides the flexibility of access from any device at any location with network connectivity, and does not require installation and maintenance. In some implementations, the image segmentation web application 268 includes various software drivers and/or modules to perform certain tasks. In some implementations, the image segmentation web application 268 includes a graphical user interface driver 276, which provides the user interface (such as graphical user interface 224) for all aspects of the image segmentation web application 268. In some implementations, the image segmentation web application 268 includes reference template generator 226 and segmentation driver 246 as described above for a computing device 200;
- an inspection application or an inspection web application 270, which may be downloaded and executed by a web browser 266 on a user's computing device 200. In general, an inspection web application 270 has the same functionality as a desktop inspection application 228, but provides the flexibility of access from any device at any location with network connectivity, and does not require installation and maintenance. In some implementations, the inspection web application 270 includes various software drivers and/or modules to perform certain tasks. In some implementations, the inspection web application 270 includes a graphical user interface driver 278, which provides the user interface (such as graphical user interface 130) for all aspects of the inspection web application 270. In some implementations, the inspection web application 270 includes inspection image driver 230, results log 232, and printer driver 234 as described above for a computing device 200;
- a data retrieval module 272 for retrieving an inspection image 126 or an inspection log 240 from the database 274;
- one or more databases 274, which store data used or created by any of the image segmentation web application 268, the image segmentation application 222, the inspection application 228, and the inspection web application 270. The databases 274 may store reference templates 110, inspection images 126, and inspection logs 240 (e.g., inspection results) as described above; and
- a buffer 280 (e.g., volatile memory) for storing the dynamic data stream 120, as described above.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 260 stores a subset of the modules and data structures identified above. In some implementations, the memory 260 stores additional modules or data structures not described above.

Although FIG. 2B shows a server 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" include various groups, collections, or arrays of servers that provide the described functionality, and the physical servers need not be physically collocated (e.g., the individual physical devices could be spread throughout the United States or throughout the world).

Figure 3A:
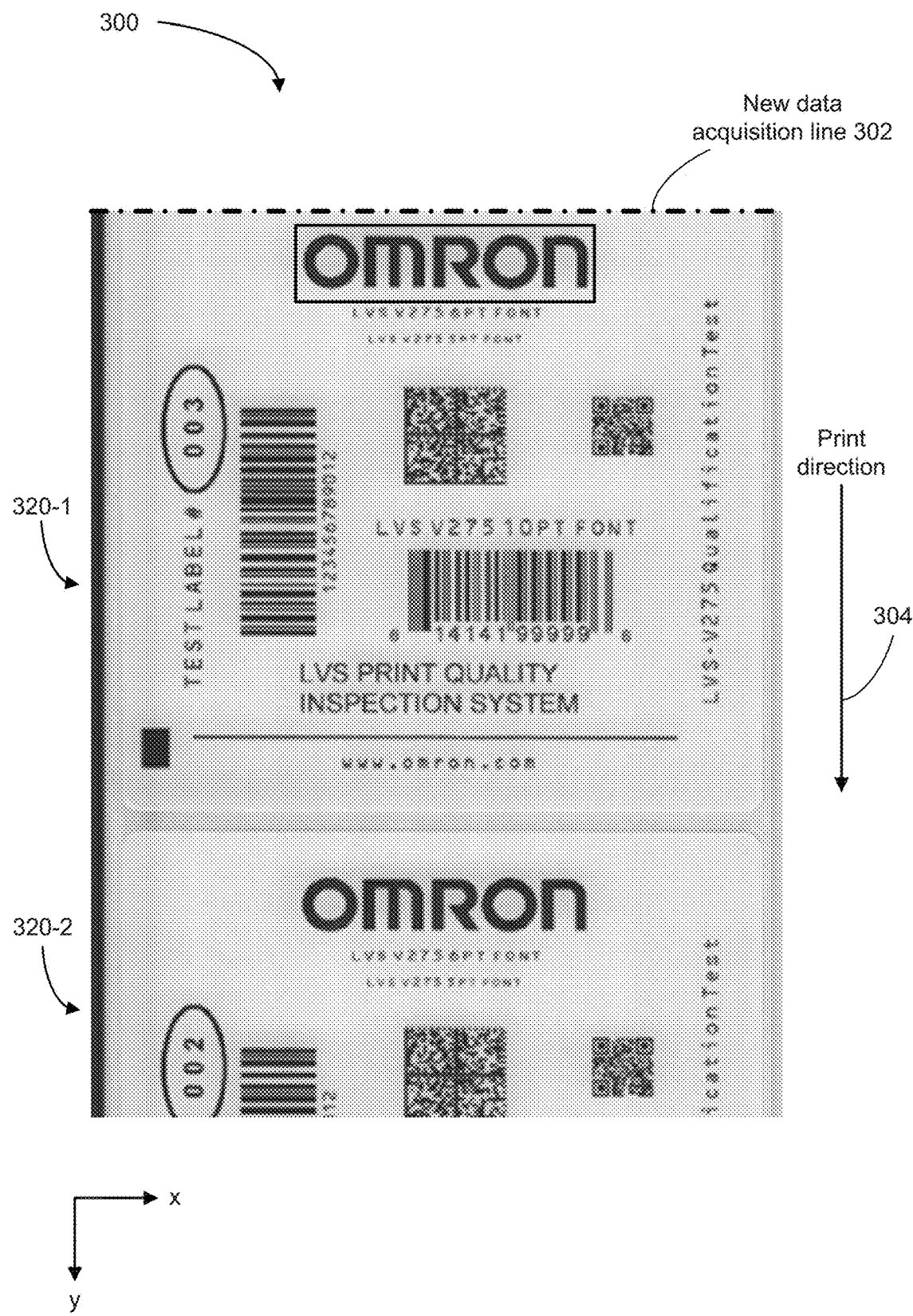
FIG. 3A illustrates a dynamic data stream according to some implementations.

FIG. 3A illustrates a dynamic data stream 300 acquired by an imaging acquisition device 104. The dynamic data stream 300 captures images of printed materials in real time (e.g., as they are printed). In this example, two printed units 320-1 and 320-2 are shown. The dynamic data stream 300 acquires images of the printed materials at the new data acquisition line 302 (e.g., along an x-axis) as the printed materials are printed and output from the printer along a print direction indicated by arrow 304 (e.g., along a y-axis).

Figure 3B:
FIGS. 3B-3D illustrate generating a reference template in accordance with some implementations.
Figure 3C:
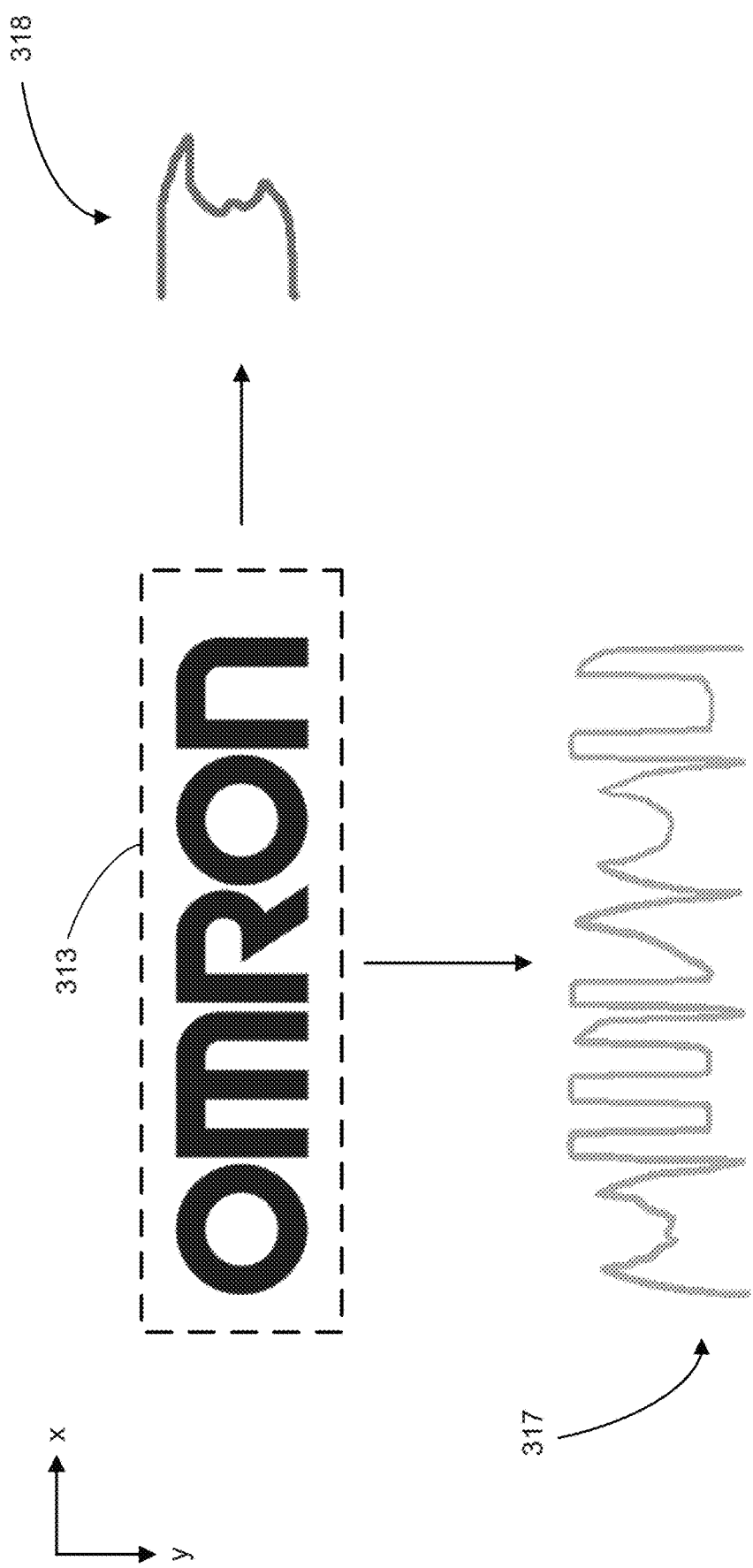
Figure 3D:
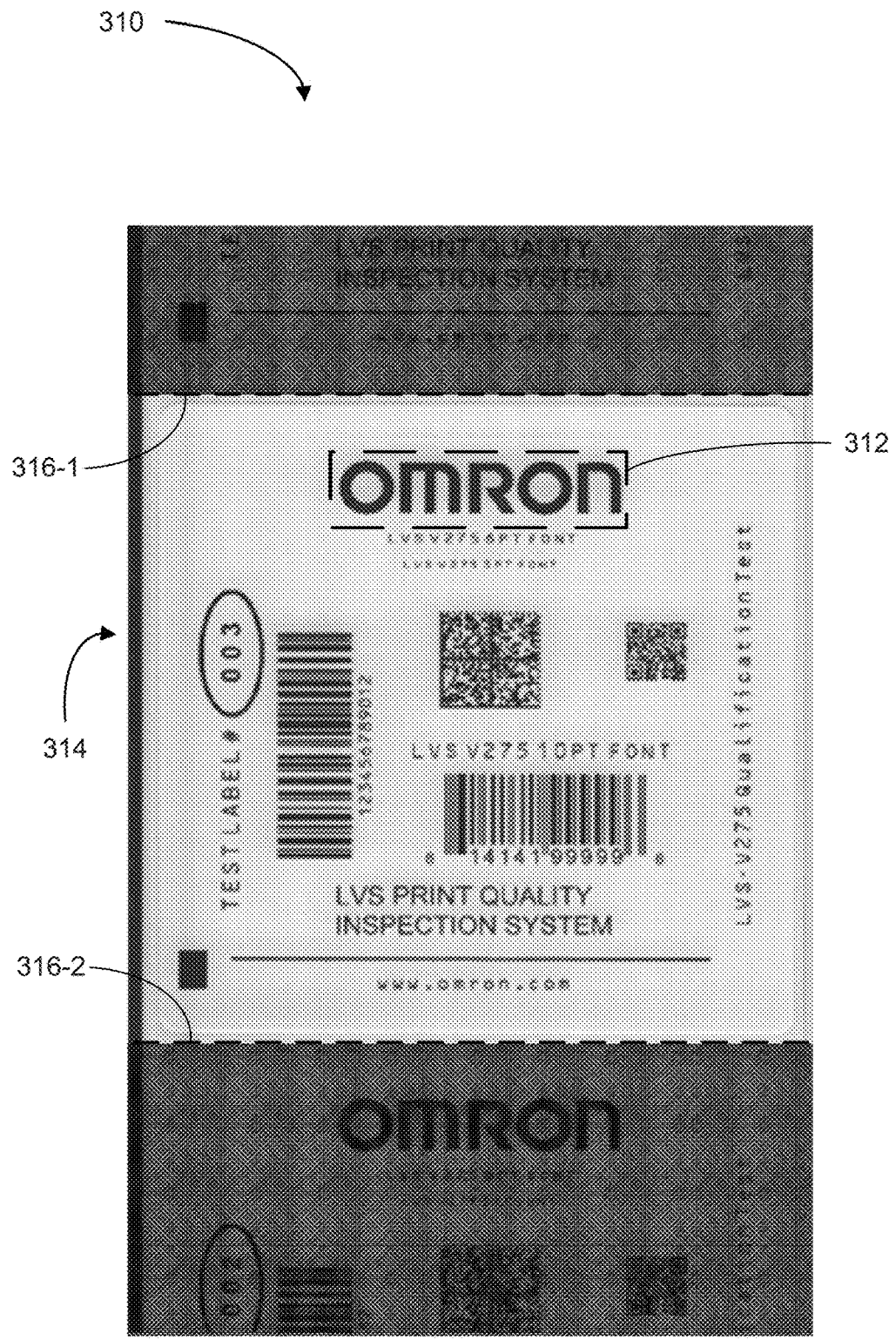

FIGS. 3B-3D illustrate generating a reference template 110 in accordance with some implementations.

FIG. 3B shows an initial image 310 that is used in generating a reference template. In some implementations, the initial image 310 is obtained from a dynamic data stream (such as dynamic data stream 300). The initial image 310 may also be a file (e.g., image file) that includes information regarding features of printed materials (e.g., pattern(s) or a design of the printed materials) or an image of a printed material or a sample of the printed material. The initial image 310 shown in FIG. 3B is generated from the dynamic data stream 300 shown in FIG. 3A. Using the initial image 310, a sync region 312 and an inspection region 114 can be defined (e.g., either manually, by a user, or automatically, by the image segmentation application). FIG. 3B shows a sync region 312 that is defined using the initial image 310. In this example, the sync region 312 corresponds to (e.g., includes) a company logo (e.g., "OMRON" logo).

FIG. 3C shows an overlay 313 that corresponds to the sync region 312 shown in FIG. 3B. The overlay 313 includes distinctive features that correspond to the features of the sync region 312, which in this example, includes features of the "OMRON" logo. As part of defining and storing the sync region 312, the reference template generator 226 projects the distinctive features of the overlay 313 along the x-axis and the y-axis via a process called a binary projection. In some implementations, the reference template generator 226 identifies each pixel of the overlay as either a foreground pixel or a background pixel (e.g., by assigning a value of 1 to foreground pixels and assigning a value of 0 to background pixels). An example of a foreground pixel is a pixel that includes print (e.g., a black pixel), and an example of a background pixel is a pixel that does not include print (e.g., a white pixel). The foreground pixels are projected along the x- and y-axes. In some implementations, each foreground pixel has an equal weight. The background pixels are not included in the projection (e.g., are subtracted out of the binary projection) such that only foreground pixels (e.g., dark or printed patterns) are included in the binary projection. The projected foreground pixels form reference signals 317 and 318 (e.g., a template signal) along the x- and y-axes, respectively. In some implementations, the reference template generator 226 also calculates a square of the reference signals. FIG. 3C shows an example of first reference signals 317 (e.g., binary projection, overlay projection, projection features) along the x-axis and second reference signals 318 (e.g., binary projection, overlay projection, projection features) along the y-axis. By projecting the foreground pixels along the two perpendicular directions (e.g., the x- and y-directions), the features shown in the dynamic data stream only need to be roughly matched to the distinctive feature(s) of the sync region 312. This 'rough' matching technique allows for high-speed matching that can be performed in real time, and has adequate match robustness to provide precise identification of sub-regions in the dynamic data stream that correspond to the sync region 312 defined in the reference template.

When using the sync region 312 as an identifying marker in a dynamic data stream, the segmentation driver 246 (e.g., image segmentation driver 246) attempts to match the reference signals (e.g., reference signals 317 and 318) with signals corresponding to features shown in the dynamic data stream. In some implementations, in order to match signals corresponding to features shown in the dynamic data stream (e.g., features printed and output from a printer 106) to the reference signals 317 and 318, the segmentation driver 246 determines (e.g., calculates) at least one of: a convolution of the first reference signal 317 with a signal corresponding to features shown in the in dynamic data stream along a direction that is normal to (e.g., perpendicular to) the print direction (e.g., the x-direction), and a convolution of the second reference signal 332 with a signal corresponding to features shown in the in dynamic data stream along the print direction (e.g., the y-direction). The segmentation driver 246 also determines (e.g., calculates) at least one of: a squared error corresponding to the convolution along the print direction (e.g., y-direction), and a squared error corresponding to the convolution along the direction that is normal to the print direction (e.g., x-direction). The segmentation driver 246 then normalizes at least one of the calculated squared errors to a square of the reference signal along the corresponding axis (e.g., respective axis) and calculates a match percentage based on the normalization. In some implementations, the segmentation driver 246 normalizes a total squared error along both axes to the square of the reference signals (e.g., both the first and second reference signals) and calculates a match percentage based on the normalization. The signals corresponding to features shown in the in dynamic data stream are considered to be a match if the calculated match percentage meets a predefined matching condition (e.g., a threshold, such as a match percentage of 50% or greater, 60% or greater, 65% or greater, 67% or greater, or 70% or greater). In accordance with the calculated match percentage meeting the predefined matching condition, the segmentation driver 246 determines a position of the signals corresponding to features shown in the in dynamic data stream as a sync position. An inspection region in dynamic data stream can be determined based on the determined sync position, and the inspection region can be extracted as an inspection image corresponding to the detected sync region (e.g., detected signals corresponding to features in the dynamic data stream).

The convolution of the reference signal with a signal corresponding to features shown in the dynamic data stream along a corresponding (e.g., same) direction (e.g., axis) allows the segmentation driver 246 to determine (e.g., find, identify) a best matching position. For example, when trying to match the first reference signals 317 to signals corresponding to features shown in the dynamic data stream along the x-direction, the matching process does not require a calculation to be performed for each new acquired line of data. As long as the first reference signals 317 and the signals corresponding to features shown in the dynamic data along the x-direction are evaluated at an interval (e.g., frequency, time interval, spatial interval) that allows the majority (e.g., at least 30%, at least 50%, at least 70%) of the foreground pixels to be analyzed, match position along the print direction (e.g., y-direction) can be determined. This allows the matching process (and subsequent extraction process of an inspection region as an inspection image) to be conducted accurately and precisely even if there are some errors in the printing process (e.g., printing offset, label wander, slanted printing).

FIG. 3D illustrates a process of defining an inspection region 314 using an initial image 310 in accordance with some implementations. In this example, the inspection region 314 corresponds to one label. The dotted lines 316-1 and 316-2 indicate margins that define the inspection region 314 such that the inspection region 314 includes a portion of the initial image 310 that is disposed between lines 316-1 and 316-2. Portions of the initial image 310 that are not included in the inspection region 314 (e.g., are not located between lines 316-1 and 316-2) are greyed out (e.g., deemphasized). The inspection region 314 is offset from the sync region 312 in at least one direction (e.g., along at least one of the x-direction and the y-direction). In some implementations, storing the inspection region 314 includes storing a predefined offset between the inspection region 314 and the sync region 312. Once both the sync region 312 and the inspection region 314 are defined, the image segmentation application 222 (or image segmentation web application 268) stores (e.g., saves) the sync region 312, including at least one of the first reference signals 317 and the second reference signals 318, and the inspection region 314, including the offset between the sync region 312 and the inspection region 314 as a reference template. The reference template includes information regarding features of the sync region 312 (e.g., reference signals 317 and/or 318) and information regarding the position of the inspection region 314 relative the features of the sync region 312. The reference template may also include any of: the initial image 310, coordinates corresponding to the sync region 312, coordinates corresponding to the inspection region 314, a portion of the initial image 310 corresponding to the sync region 312, and the distinctive feature(s) corresponding to the sync region 312. For example, the reference template may include a reference signals 317 and 318, an offset value along the y-axis corresponding to an offset of the inspection region 314 from the sync region 312, and a size of the inspection region 314.

Figure 3E:
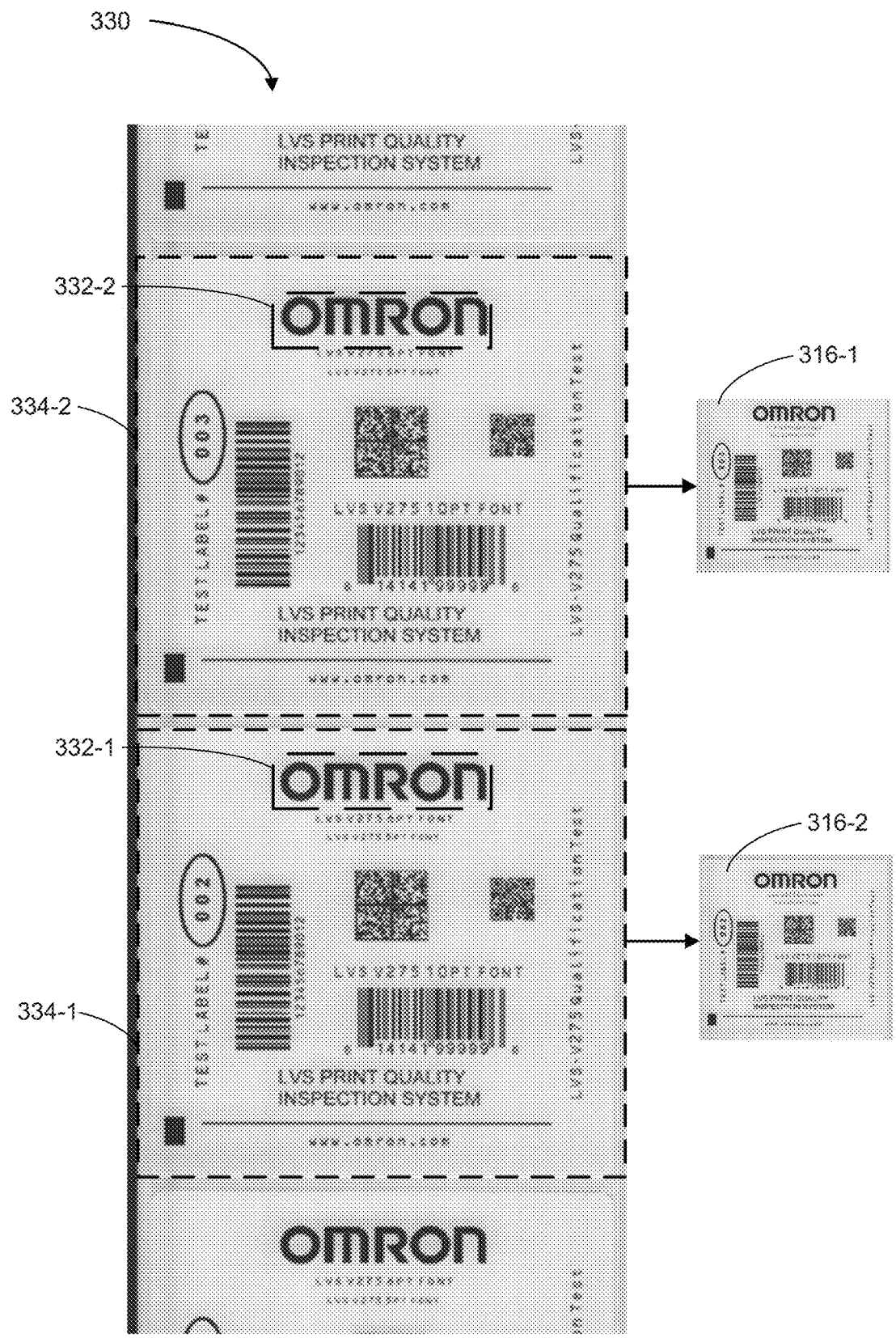
FIG. 3E illustrates segmenting a dynamic data stream in accordance with some implementations.

FIG. 3E illustrates segmenting a dynamic data stream 330 in accordance with some implementations. Following the example provided above with regards to generating a reference template, including defining a sync region 312 and an inspection region 314 using initial image 310, the dynamic data stream 330 shows images of printed units (e.g., labels) that correspond to the initial image 310 (e.g., have a same or similar pattern to the initial image 310). Using the reference template, the segmentation driver 246 (of image segmentation application 222 or image segmentation application 268) identifies one or more sub-regions 322 in the dynamic data stream 330 that correspond to the defined sync region 312. In some implementations, identification of the sub-region(s) 322 is performed using a matching method described above with respect to FIG. 3C.

As the dynamic data stream 330 is generated (e.g., by acquiring image frames of printed materials as they are being printed in real time), the segmentation driver 246 continuously attempts (e.g., tries) to match features shown on the dynamic data stream 330 with the features shown in the sync region 312 (e.g., by matching signals corresponding to features in the dynamic data stream 330 to reference signals 317 and/or 318 corresponding to the sync region 312). For each new sub-region 332 that is identified, the segmentation driver 246 identifies a respective (e.g., corresponding) inspection region 334, extracts the inspection region 334 and stores the extracted inspection region 334 as an inspection image 336 (e.g., segments the dynamic data stream 330 into distinct inspection images and stores the inspection images).

As shown in FIG. 3E, a first sub-region 332-1 and a second sub-region 332-2 of the dynamic data stream 330 are identified as corresponding to the sync region 312. The segmentation driver 246 identifies a first inspection region 334-1 corresponding to a first individual print unit (e.g., first label, label #002) based on the identification of the first sub-region 332-1 (e.g., a location of the first sub-region 332-1), extracts the first inspection region 334-1 (e.g., segments the dynamic data stream 330), and stores the extracted first inspection region 334-1 as a first inspection image 316-1. The segmentation driver 246 also identifies a second inspection region 334-2 corresponding to a second individual print unit (e.g., second label, label #003) based on the second sub-region 332-2 (e.g., a location of the second sub-region 332-2), extracts the second inspection region 334-2 (e.g., segments the dynamic data stream 330), and stores the extracted second inspection region 334-2 as a second inspection image 316-2. The second inspection image 316-2 is distinct (e.g., different) and separate from the first inspection image 316-1. In some implementations the first inspection image 316-1 is stored as a first file (e.g., image file) and the second inspection image 316-2 is stored as a second file (e.g., image file) that is distinct (e.g., different) from the first file.

Figure 4A:
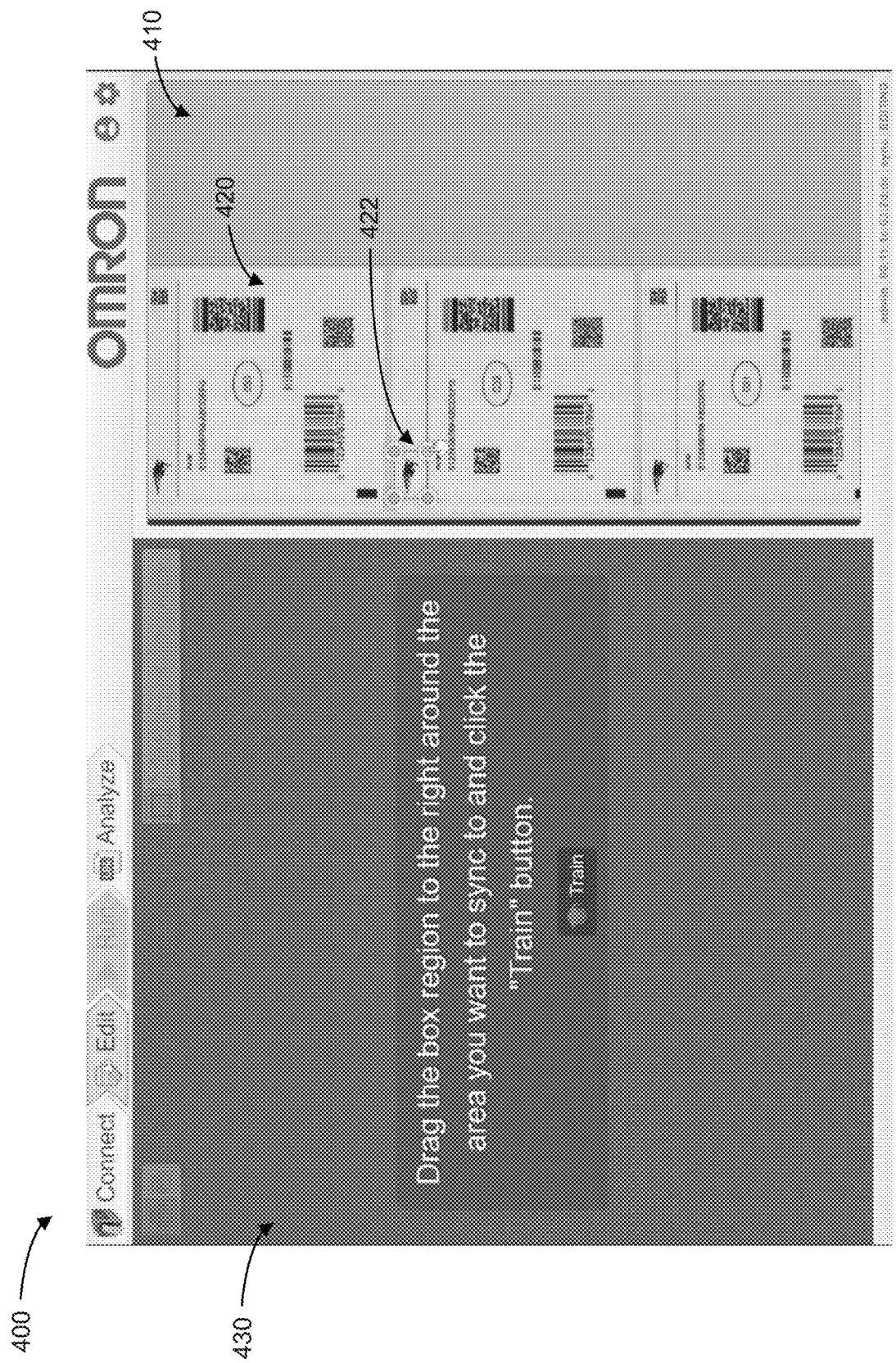
FIGS. 4A and 4B illustrate a user interface for generating a reference template in accordance with some implementations.
Figure 4B:
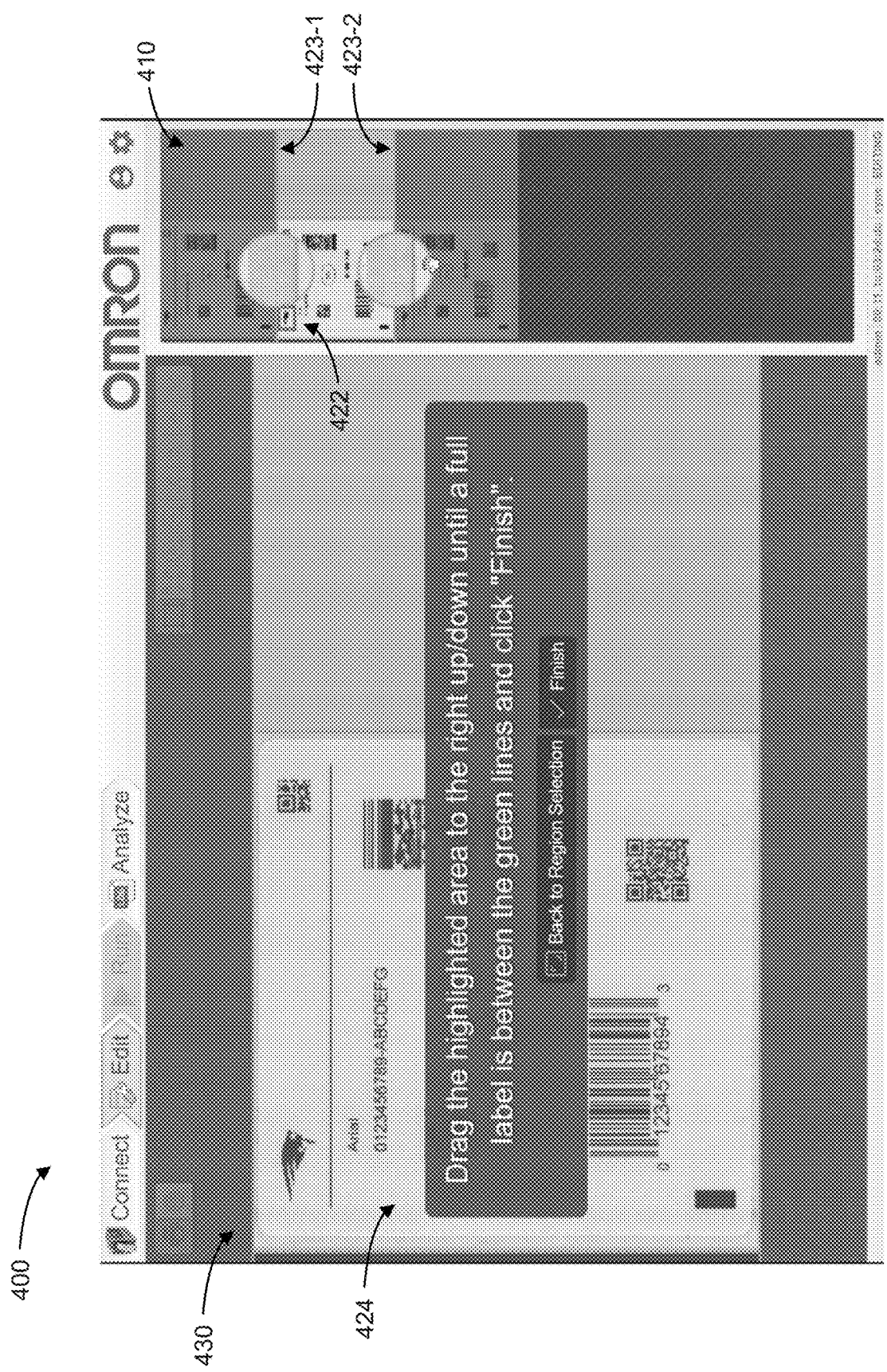

FIGS. 4A and 4B illustrate a user interface 400 for generating a reference template in accordance with some implementations. FIGS. 4A and 4B show a graphical user interface 400 (corresponding to any of graphical user interface 224 of image segmentation application 222 and graphical user interface driver 276 of image segmentation web application 268) for generating a reference template, including defining sync region(s) and inspection region(s) using an initial image. The graphical user interface 400 includes a panel 410 that illustrates an initial image 420. Using the initial image 420 (which in this case is an image obtain from a dynamic data stream), a user can select (e.g., define) a sync region 422. In this example, a user has identified (e.g., defined) the sync region 422 by drawing a rectangular box around a logo shown in the initial image 420. In some implementations, as shown, graphical user interface 400 also includes a visualization region 430. In some implementations, as shown, the graphical user interface 400 may display one or more instructions (e.g., prompts, directions, tips) in the visualization region 430 to help the user in setting up a reference template, such as instructions for how to define a sync region 422. Once the sync region 422 is defined, the user can proceed to define an inspection region.

As shown in FIG. 4B, a user may move lines 423-1 and 423-2, shown in the panel 410 to define an inspection region 424 such that the inspection region 424 is located between the lines 423-1 and 423-2. In some implementations, as the user adjusts the position of any of the lines 423-1 and 423-2, visualization region 430 is updated to display portions of the initial image that are between the lines 423-1 and 423-2. In some implementations, the visualization region 430 also displays one or more instructions (e.g., prompts, directions, tips) in the visualization region 430 to help the user in defining the inspection region 424. In some implementations, the one or more instructions include a first option to save all selections (e.g., store information corresponding to the defined sync region 422 and inspection region 424, the "finish button") and a second option to return to a sync region editing step and define a new sync region (e.g., the "back to region selection" button). Once the user has accepted the defined sync region 422 and the defined inspection region 424 (e.g., the user selects the "Finish" button), the image segmentation application 222 (or image segmentation web application 268) generates a reference template and stores the reference template in a memory of the computing system 100 (such as on a computing device running the image segmentation application 222) for use in segmenting frames (e.g., images) of a dynamic data stream into inspection images.

Figure 4C:
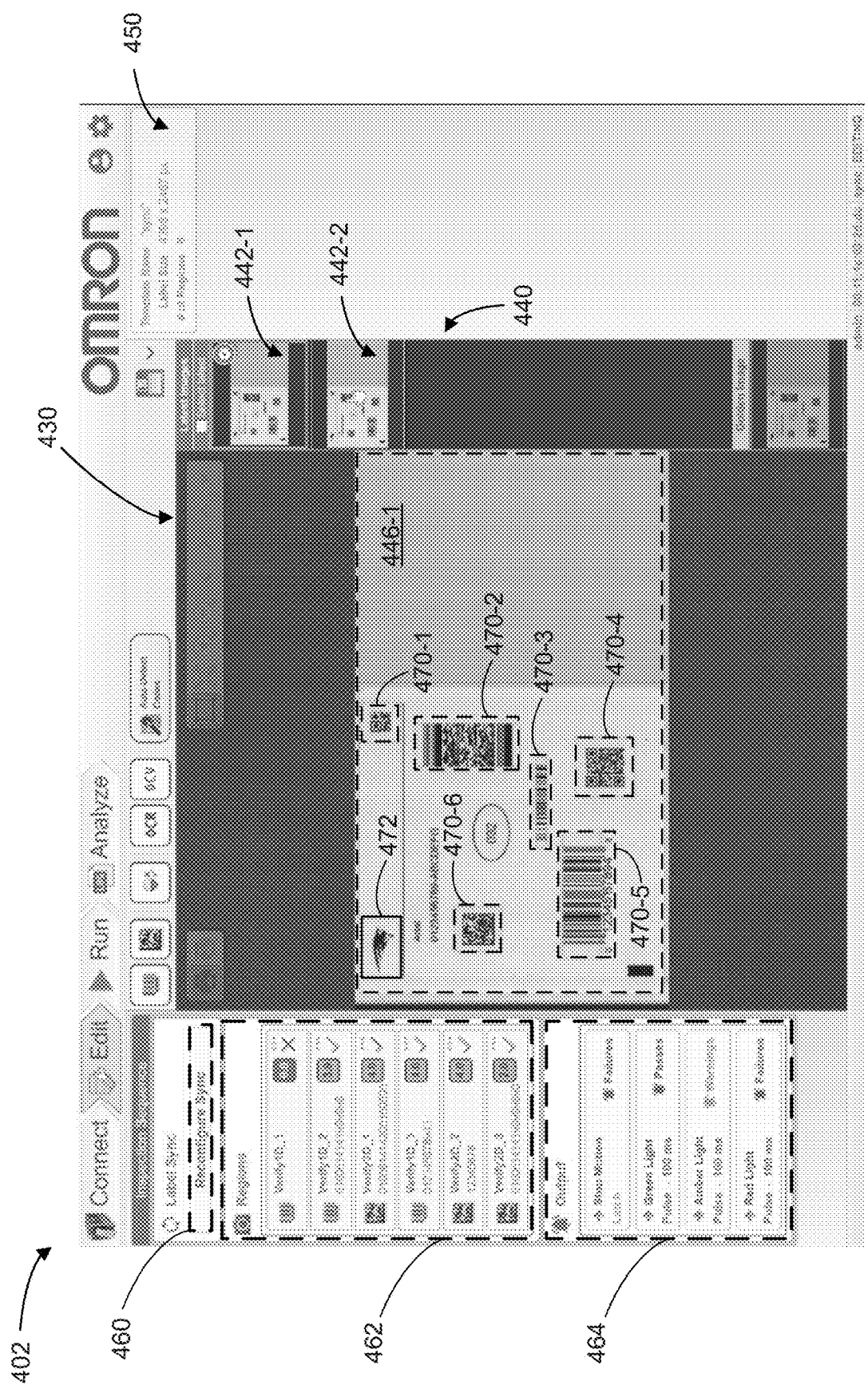
FIG. 4C illustrates a user interface for inspection of a segmented inspection image in accordance with some implementations.

FIG. 4C illustrates a user interface 402 for inspection of a segmented inspection image in accordance with some implementations. FIG. 4C shows a graphical user interface 402 (corresponding to any of graphical user interface 130 of inspection application 228 and graphical user interface driver 278 of inspection web application 270). In some implementations, the image segmentation application 222 and the inspection application 228 are part of a same program (e.g., computer program) such that a computer application is able to launch (e.g., seamlessly launch) and transition (e.g., seamlessly transition) between the two applications. The graphical user interface 402 may include any of:

- visualization region 430 for displaying inspection images 446;
- a thumbnail panel 440 for displaying thumbnails 442 (e.g., previews) of inspection images 446 that have been segmented (e.g., extracted) from a dynamic data stream;
- an information panel 450 for displaying information regarding an inspection image 446 being displayed in the visualization region 430 and/or information regarding inspection images 446 that are being inspected;
- an affordance 460 for reconfiguring (e.g., redefining, updating, editing) a sync region 422 and/or an inspection region 444 of the reference template;
- an inspection log 462 for displaying inspection results;
- a printer status log 464 for displaying a status of a printer (such as printer 106) that is in communication with the computer system 100; and
- a reference template icon 466 (e.g., golden image icon) corresponding to a reference template used to segment the dynamic data stream and generate the inspection images 446.

For example, as shown in FIG. 4C, the visualization region 430 is currently displaying a first inspection image 446-1. The thumbnail panel 440 indicates that two inspection images are currently available for inspection. In some implementations, such as when segmentation of a dynamic data stream is performed in real time (e.g., as the printed materials are being printed), the thumbnail panel 440 may continue to populate with additional thumbnails 442 as more inspection images 446 are extracted (e.g., segmented) from the dynamic data stream and stored (e.g., saved). Additionally, information panel 450 displays a name of an inspection template being used, a label size (e.g., size of an individual printed unit), and a number of regions to be inspection. In this example, the name of the inspection template is "sync" and the inspection template defines 6 feature regions 470 for inspection. The six feature regions 470 (e.g., feature regions 470-1 to 470-6) that are defined in the "sync" template are shown in dashed squares in the visualization region 430 (overlaid on top of the inspection image), as well as shown in the inspection log 462. In this example, five of the feature regions 470 have passed inspection (including feature region 470-4, which received a low score of 2.0), and the feature region 470-2 has failed inspection. A sub-region 472 of the inspection image 446-1 that corresponds to the sync region 422 (as defined in the reference template) is shown by a solid box.

In some implementations, the feature regions 470 are automatically identified by the inspection image driver 230 of the inspection application 228 (or the inspection web application 270). For example, the "sync" inspection template may be configured such that the inspection image driver 230 automatically identifies (e.g., defines) portions of the inspection image 446-1 that include barcodes as feature regions 470 to be inspected. In some implementations, the feature regions 470 are identified (e.g., defined) in the "sync" inspection template by a user.

For example, when a feature region includes a 1-dimensional (1D) barcode, inspection of the feature region may include detecting edges of the 1D barcode, measuring widths and heights of bars in the 1D barcode, and verifying the measured widths and heights using barcode standards. Additionally, bar size and bar spacing may be inspected for uniformity and to confirm that the contrast between bars and spaces meet a standard or threshold contrast level. Information stored in the 1D barcode may also be decoded and validated using data structure standards.

In another example, when a feature region includes a 2-dimensional (2D) barcode, inspection of the feature region may include identifying fixed patterns according to symbology, extracting and measuring grey levels at grid locations to decode data, and measuring print contrast and uniformity.

In a yet another example, when a feature region includes text or visual marks (also known as "blemishes"), inspection of the feature region may include using threshold and/or blob detection to identify the text and/or visual marks in the feature region. When the feature region includes text, optical character recognition (OCR) and/or optical character verification (OCV) may be used to interpret the text using classification methods. When the feature region includes visual mark(s), the detected objects (also known as "blobs") may be compared to a golden image that represents an ideal print image to identify and measure print deviations and defects.

Figure 5A:
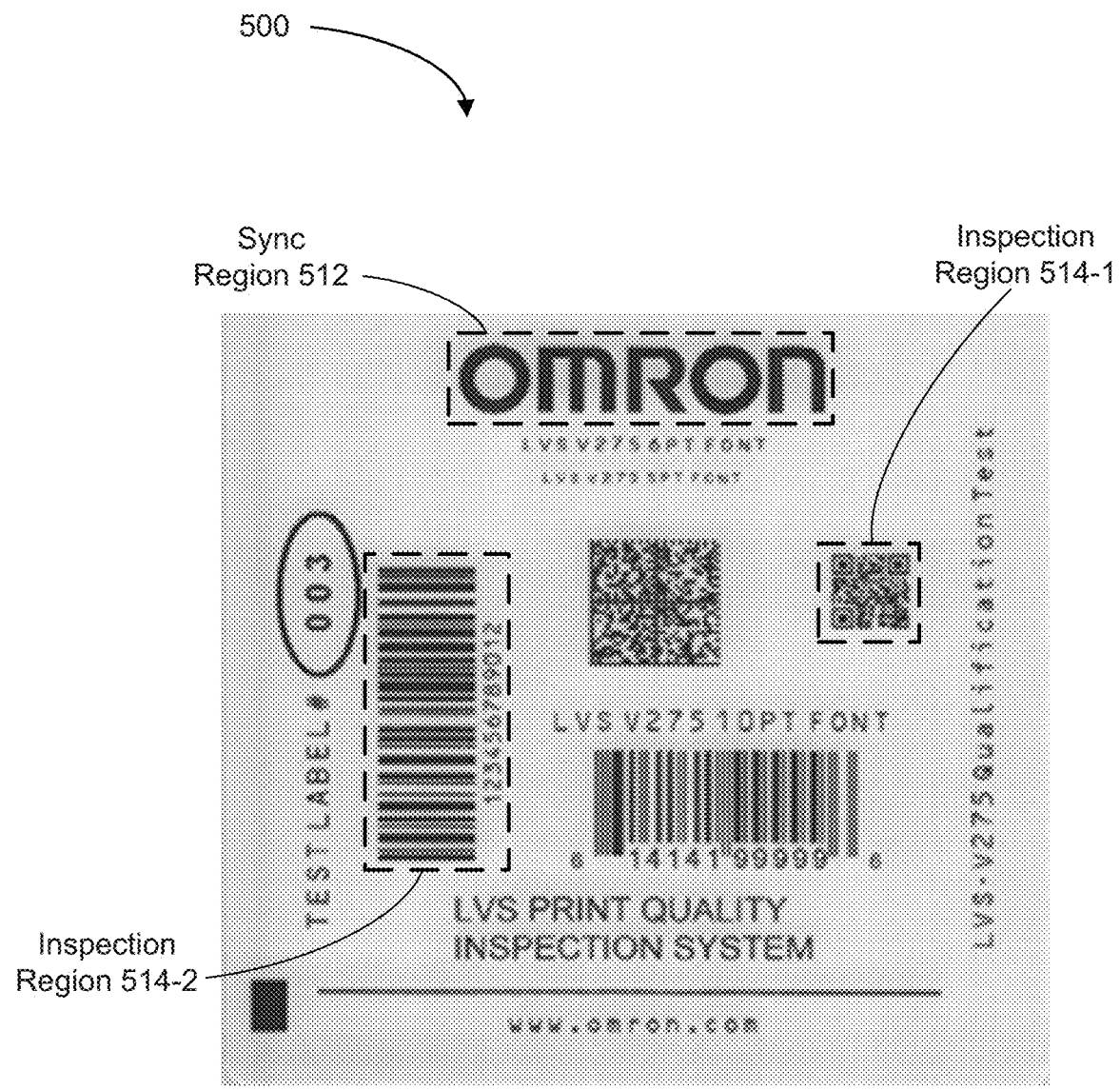
FIGS. 5A and 5B illustrate examples of reference templates in accordance with some implementations.
Figure 5B:
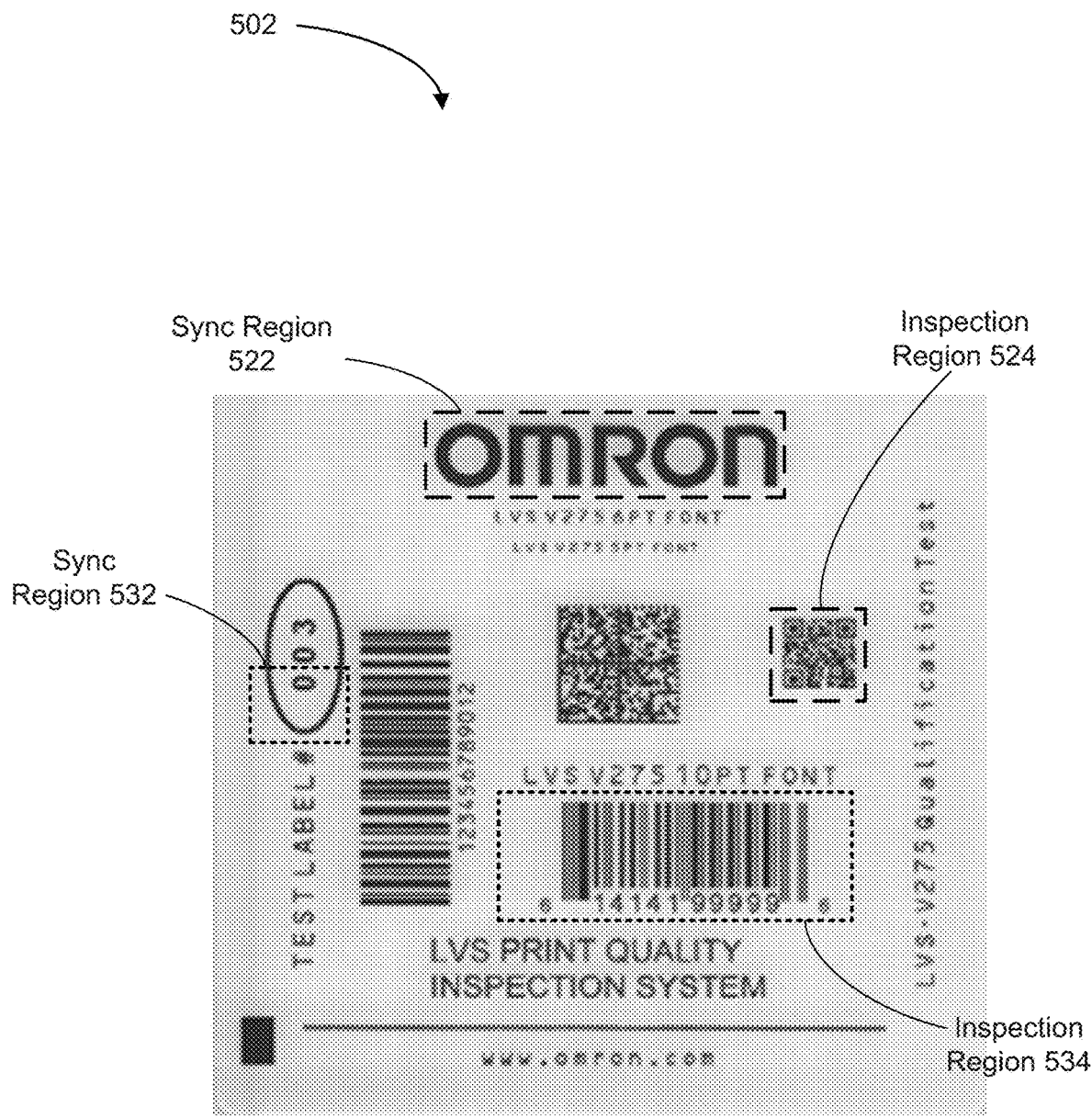

FIGS. 5A and 5B illustrate examples of reference templates in accordance with some implementations.

FIG. 5A illustrates an example of a reference template 500 that includes one sync region 512 and a plurality of inspection regions 514-1 and 514-2. In this example, for each sub-region in a dynamic data stream that is identified that corresponds to the sync region 512, two inspection images are generated, a first inspection image showing a portion of the dynamic data stream that corresponds to inspection region 514-1 and a second inspection image showing a portion of the dynamic data stream that corresponds to inspection region 514-2.

FIG. 5A illustrates an example of a reference template 502 that includes a plurality of sync regions 522 and 532, and a plurality of inspection regions 524 and 534. In this example, for each sub-region in a dynamic data stream that is identified that corresponds to the sync region 522, an inspection image showing a portion of the dynamic data stream that corresponds to inspection region 524 is stored. Similarly, for each sub-region in a dynamic data stream that is identified that corresponds to the sync region 532, an inspection image showing a portion of the dynamic data stream that corresponds to inspection region 534 is stored. Thus, a user may customize the inspection image to correspond to any portion of information in the dynamic data stream.

Figure 6A:
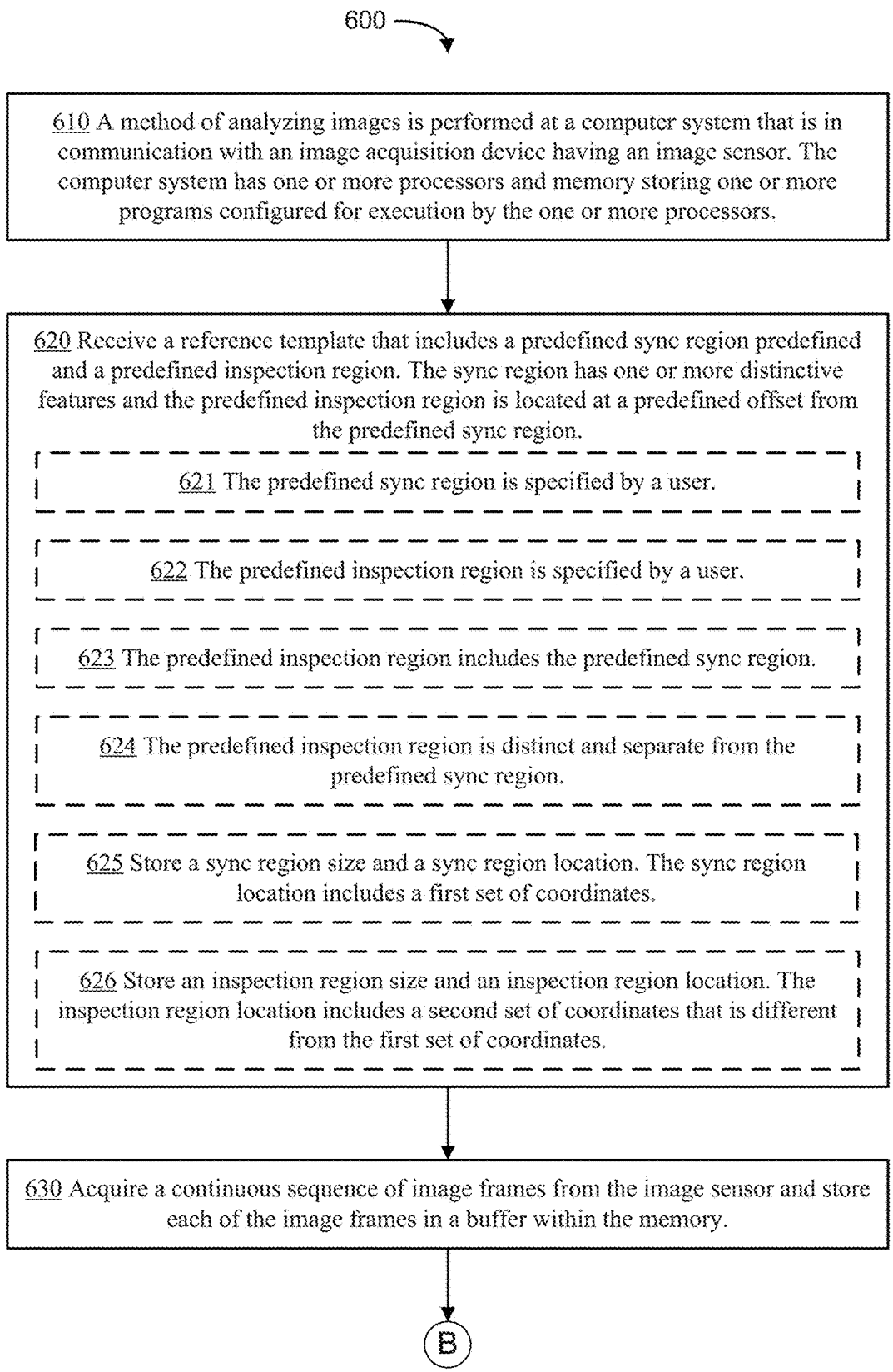
FIGS. 6A-6C provide a flow diagram of a method for analyzing images in accordance with some implementations.
Figure 6B:
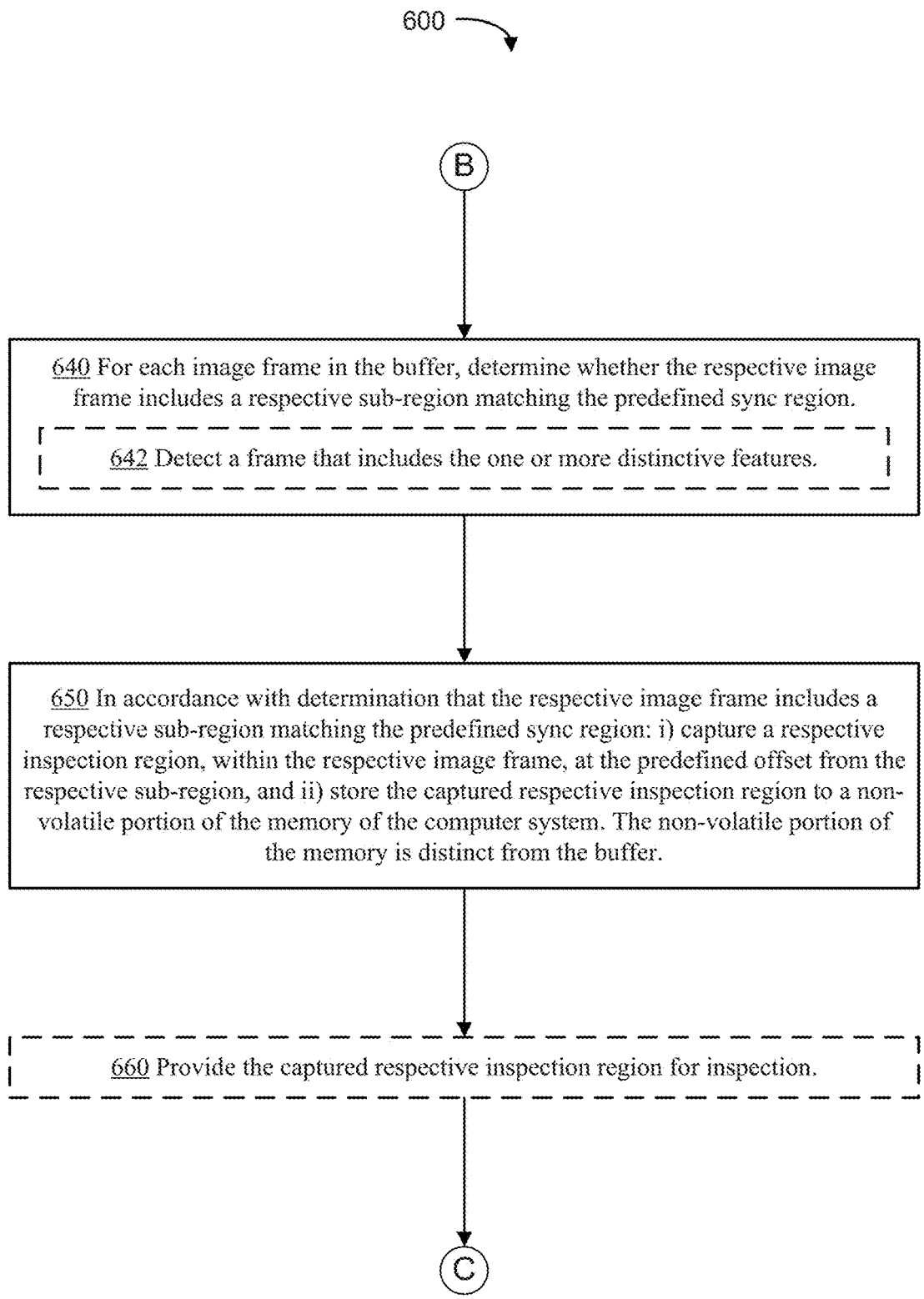
Figure 6C:
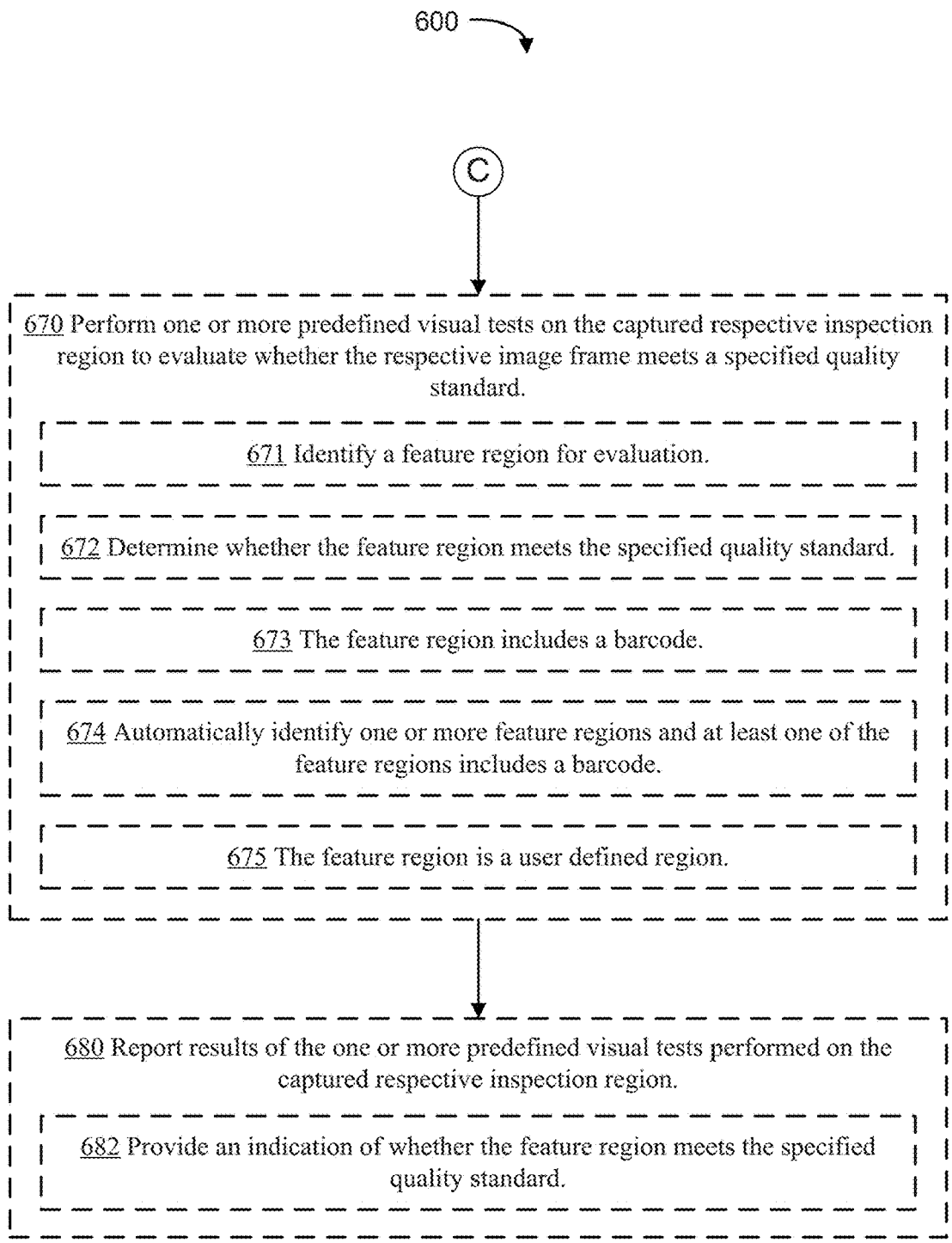

FIGS. 6A-6C illustrate flow diagrams of a method 600 for analyzing images (e.g., inspection images 126) in accordance with some implementations. The steps of the method 600 may be performed by a computer system 100, corresponding to a computer device 200 or a server 290. In some implementations, the computer system 100 includes one or more processors and memory. FIGS. 6A and 6B correspond to instructions stored in a computer memory or computer-readable storage medium (e.g., the memory 214 of the computing device 200). The memory stores one or more programs configured for execution by the one or more processors. For example, the operations of the method 600 are performed (610), at least in part, by a segmentation driver 246.

In accordance with some implementations, a computer system 100 (or computing device 200 of the computing system 100) is in communication with an image acquisition device 104 that includes an image sensor (e.g., a CCD sensor, a CCD camera, a camera). The computer system 100 receives (620) a reference template 110 that includes a predefined sync region 112 and a predefined inspection region 114. The sync region 112 has one or more distinctive features and the predefined inspection region 114 is located at a predefined offset from the predefined sync region 112. The computer system 100 then acquires (630) a continuous sequence of image frames (e.g., dynamic data stream 120, video) from the image sensor and stores each of the image frames in a buffer within the memory (e.g., buffer 244 in memory 214 or buffer 280 in memory 260). For each image frame in the buffer, the computer 100 determines (640) whether the respective image frame includes a respective sub-region 122-2 that matches the predefined sync region 112. In accordance with determination that the respective image frame (e.g., dynamic data stream 120) includes a respective sub-region 122-1 matching the predefined sync region 112, the computer system 100: (i) captures (650) a respective inspection region 124-1, within the respective image frame (e.g., within the dynamic data stream 120), at the predefined offset from the respective sub-region 122-1, and ii) stores (650) the captured respective inspection region 124-1 to a non-volatile portion of the memory of the computer system 100 as an inspection image 126-1. The non-volatile portion of the memory is distinct from the buffer.

In some implementations, the predefined sync region 112 is specified (621) by a user (e.g., a user selects a portion of an initial image 310 as corresponding to the sync region 312).

In some implementations, the predefined inspection region 114 is specified (622) by a user (e.g., a user selects a portion of an initial image 310 as corresponding to the inspection region 314).

In some implementations, the predefined inspection region 114 includes (623) the sync region 112 such that the inspection image 126 includes the sub-region 122. For example, as shown in FIG. 1B, the inspection region 114 includes the sync region 112 (see also in FIG. 1C, the inspection image 126-1 includes the logo. In another example, shown in FIG. 3D, the inspection region 314 includes the sync region 312 (see also FIG. 4C, the inspection image 446-1 includes the sub-region 472 that corresponds to the logo).

In some implementations, the predefined inspection region 114 is separate (624) from (e.g., is distinct from, does not overlap with, does not include) the sync region 112 such that the inspection image 126 is separate from (e.g., is distinct from, does not overlap with, does not include) the sub-region 122.

In some implementations, the computer system 100 stores information regarding the sync region 112, including storing (625) a sync region size and a sync region location. The sync region location includes a first set of coordinates 113.

In some implementations, the computer system 100 stores information regarding the inspection region 114, including storing (626) an inspection region size and an inspection region location. The inspection region location includes a second set of coordinates 115 that are different from the first set of coordinates 113. In some implementations, the first set of coordinates 113 and the second set of coordinates 115 reference a same origin 117 (e.g., are part of a same coordinate system).

In some implementations, in order to determine (640) whether the respective image frame (e.g., dynamic data stream 120) includes a respective sub-region 122 matching the predefined sync region 112, the computer system 100 detects (642) a frame (e.g., image frame, video frame) that includes the one or more distinctive features corresponding to the sync region 112. For example, the computer system 100 may match reference signals 317 and 318, corresponding to a sync region 312, with signals corresponding to features shown in the dynamic data stream 320 using a rough matching method as described above with respect to FIG. 3C.

In some implementations, the computer system 100 provides (660) the captured respective inspection region 114 for inspection (e.g., as an inspection image 126). For example, FIG. 4C illustrates a graphical user interface 402 that displays an inspection image 446-1 so that the computer system 100 or a user of the computer system 100 may perform one or more inspection tests on the inspection image 446-1.

In some implementations, the computer system 100 performs (670) one or more predefined visual tests on the captured respective inspection region (e.g., inspection image 446-1) to evaluate whether the respective image frame meets a specified quality standard. For example, FIG. 4C illustrates an inspection image 446-1 that has undergone one or more visual tests and results of the visual test(s) are displayed in the inspection log 462.

In some implementations, in order to perform (670) the one or more predefined visual tests, the computer system 100 identifies (671) a feature region 470 for evaluation (e.g., validation, inspection).

In some implementations, in order to perform (670) the one or more predefined visual tests, the computer system 100 determines (672) whether the feature region 470 meets the specified quality standard.

In some implementations, the feature region 470 includes a barcode (e.g., a quick response code (QR code), 1D barcode, 2D barcode). For example, feature region 470-4 includes a QR code. In another example, feature region 470-5 includes a barcode.

In some implementations, in order to perform (670) the one or more predefined visual tests, the computer system 100 automatically identifies (674) one or more feature regions 470 and at least one of the feature regions 470 includes a barcode.

In some implementations, the feature region 470 is a user defined region. For example, a user may generate an inspection template that identifies portions of the inspection image as being feature regions 470 and including information or features that needs to be inspected.

In some implementations, the computer system 100 reports (680) results of the one or more predefined visual tests performed on the captured respective inspection region (e.g., inspection image 126 or 446-1).

In some implementations, the computer system 100 provides (682) an indication of whether the feature region 470 meets the specified quality standard.

Figure 7:
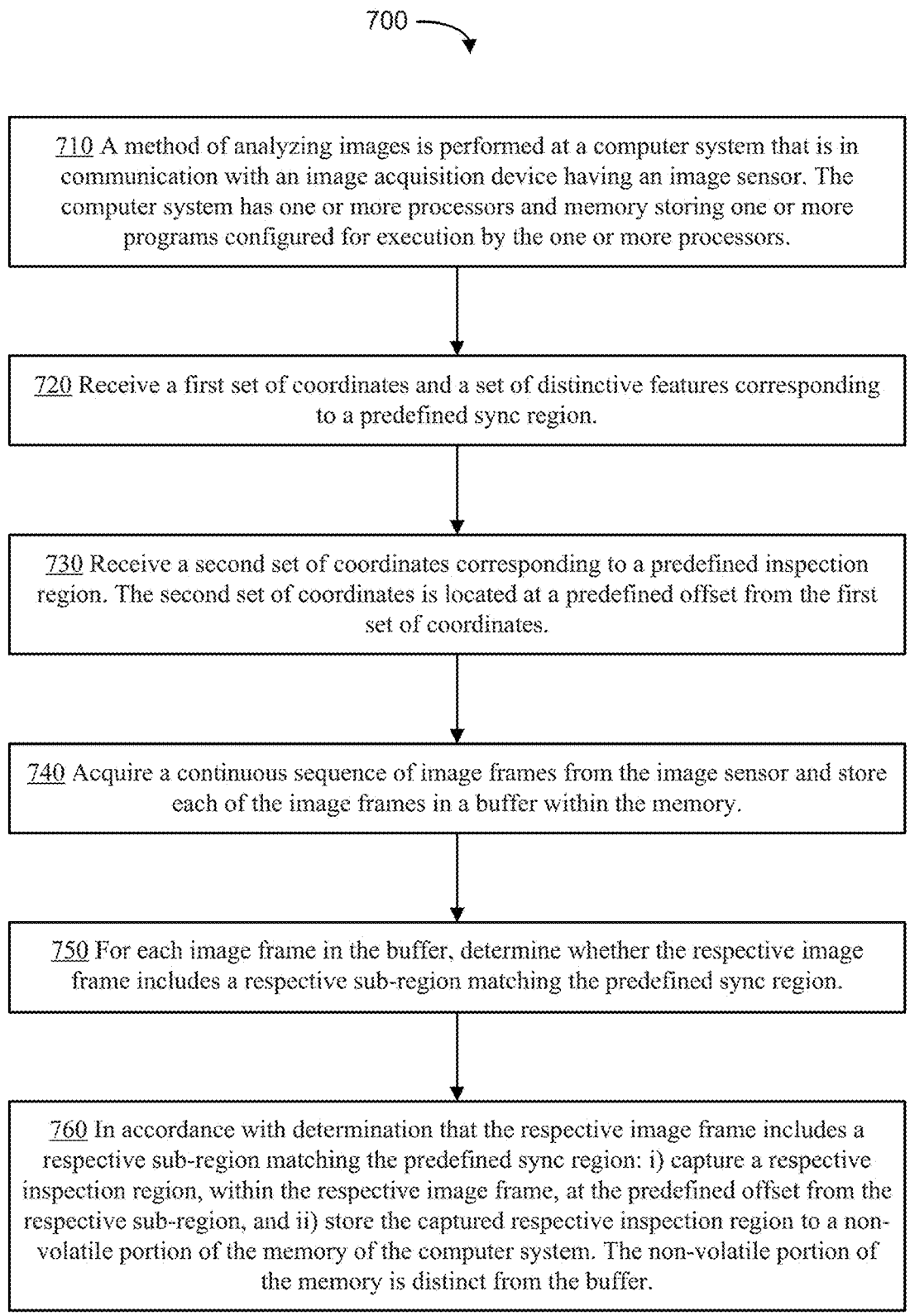
FIG. 7 provides a flow diagram of a method for analyzing images in accordance with some implementations.

FIG. 7 illustrates a flow diagram of a method 700 for analyzing images in accordance with some implementations. The steps of the method 700 may be performed by a computer system 100, corresponding to a computer device 200 or a server 290. In some implementations, the computer system 100 includes one or more processors and memory. FIG. 7 corresponds to instructions stored in a computer memory or computer-readable storage medium (e.g., the memory 214 of the computing device 200). The memory stores one or more programs configured for execution by the one or more processors. For example, the operations of the method 700 are performed (710), at least in part, by a segmentation driver 246.

In accordance with some implementations, a computer system 100 (or computing device 200 of the computing system 100) is in communication with an image acquisition device 104 that includes an image sensor (e.g., a CCD sensor, a CCD camera, a camera). The computer system 100 receives (720) a first set of coordinates 113 and a set of distinctive features corresponding to a predefined sync region 112. The computer system also receives (730) a second set of coordinates 115 corresponding to a predefined inspection region 114. The computer system 100 then acquires (740) a continuous sequence of image frames (e.g., dynamic data stream 120, video) from the image sensor and stores each of the image frames in a buffer within the memory (e.g., buffer 244 in memory 214 or buffer 280 in memory 260). For each image frame in the buffer, the computer 100 determines (740) whether the respective image frame includes a respective sub-region 122-2 that matches the predefined sync region 112. In accordance with determination that the respective image frame (e.g., dynamic data stream 120) includes a respective sub-region 122-1 matching the predefined sync region 112, the computer system 100: (i) captures (750) a respective inspection region 124-1, within the respective image frame (e.g., within the dynamic data stream 120), at the predefined offset from the respective sub-region 122-1, and ii) stores (750) the captured respective inspection region 124-1 to a non-volatile portion of the memory of the computer system 100 as an inspection image 126-1. The non-volatile portion of the memory is distinct from the buffer.

Figure 8A:
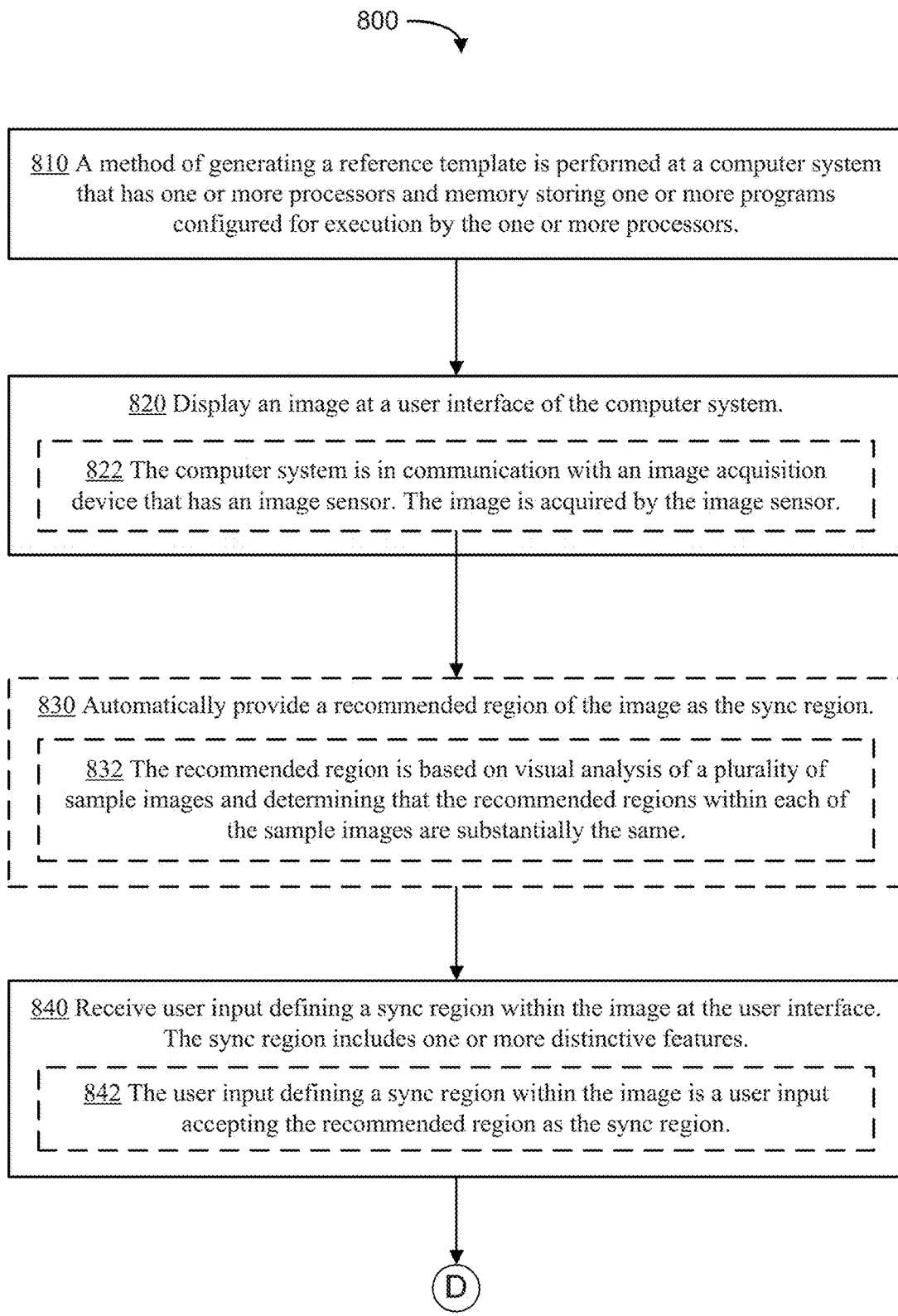
FIGS. 8A and 8B provide a flow diagram of a method for generating a reference template in accordance with some implementations.
Figure 8B:
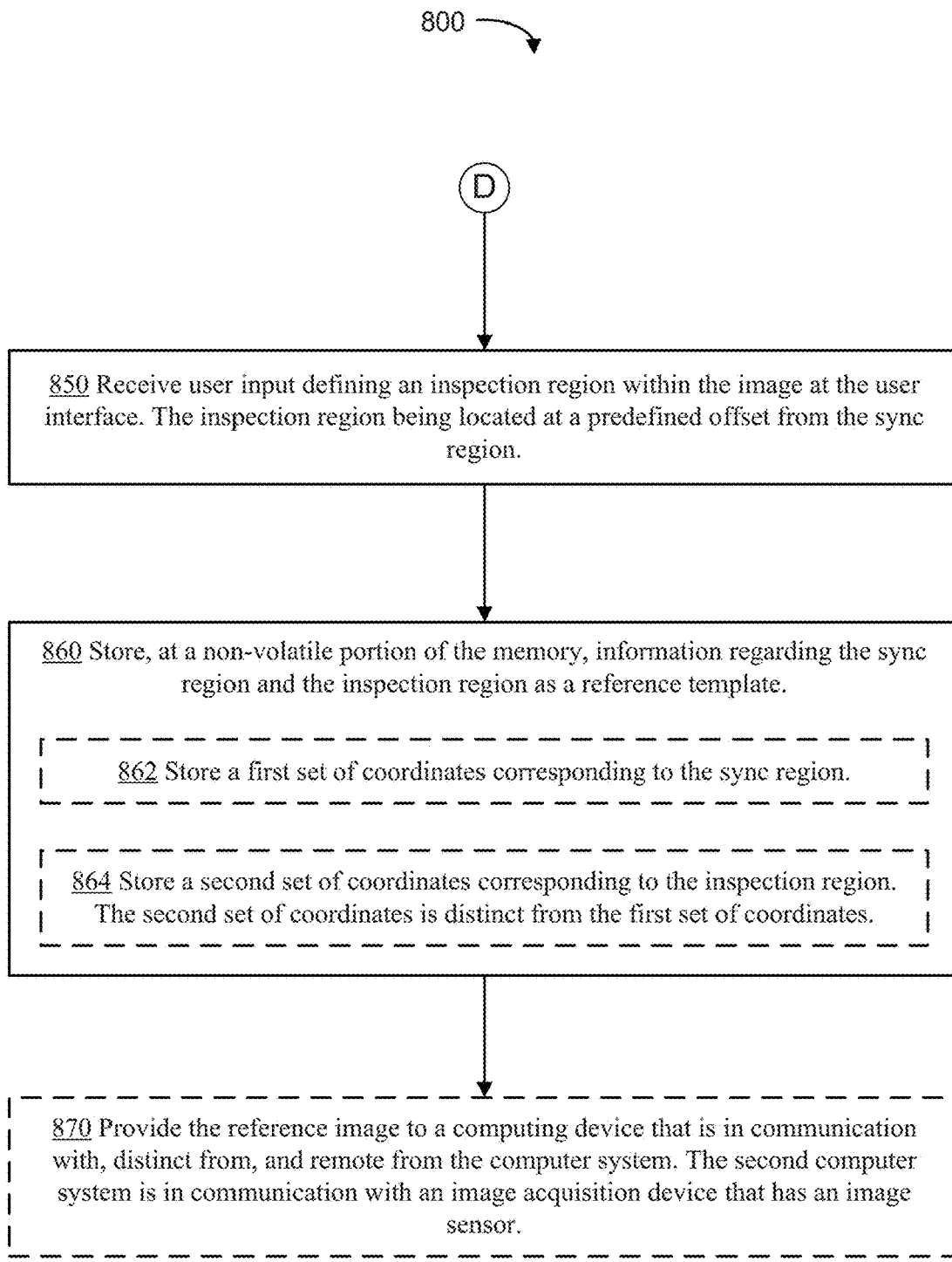

FIGS. 8A and 8B illustrate flow diagrams of a method 800 for generating a reference template in accordance with some implementations. The steps of the method 800 may be performed by a computing device 200, which may correspond to computing device 102 in communication with the computer system 100 or a server 290). In some implementations, the computing device 200 includes one or more processors and memory. FIGS. 8A and 8B correspond to instructions stored in a computer memory or computer-readable storage medium (e.g., the memory 214 of the computing device 200). The memory stores one or more programs configured for execution by the one or more processors. For example, the operations of the method 800 are performed (810), at least in part, by a reference template generator 226.

In accordance with some implementations, the computing device 200 displays (820) an image (e.g., initial image 310) at a user interface of the computer device 200. The computer device 200 receives (840) user input defining a sync region 312 within the initial image 310 at the user interface 130. The sync region 312 includes one or more distinctive features. The computer device 200 also receives (850) user input defining an inspection region 314 within the initial image 310 at the user interface 130. The inspection region 314 is located at a predefined offset from the sync region 312. The computer device 200 then stores, at a non-volatile portion of the memory 214, information regarding the sync region 312 and the inspection region 314 as a reference template.

In some implementations, the computing device 200 automatically provides (830) a recommended region of the image 310 as the sync region 312. In some implementations, the recommended region is recommended based on visual analysis of a plurality of sample images and determining that the recommended regions within each of the sample images are substantially the same.

In some implementations, the user input defining (842) a sync region 312 within the initial image 310 is a user input accepting the recommended region as the sync region 312.

In some implementations, storing (860) the information regarding the sync region 312 as a reference template includes storing (862) a first set of coordinates corresponding to the sync region 312. In some implementations, the computing device 200 also stores any of an image of the one or more distinctive features corresponding to the sync region 312 and reference signals 317 and 318 corresponding to the sync region 312.

In some implementations, storing (860) the information regarding the inspection region 314 as a reference template includes storing (864) a second set of coordinates corresponding to the inspection region 314. The second set of coordinates is distinct (e.g., different) from the first set of coordinates.

In some implementations, storing (860) the information regarding the sync region 312 and the inspection region 314 as a reference template includes storing the initial image 310 (e.g., initial image 310) used to generate the reference template.

In some implementations, the computing device 200 also provides (870) the reference template to a second computer system (e.g., second computing device) that is in communication with, distinct from, and remote from the computing device 200 of the computing system 100. The second computer system is in communication with an image acquisition device 104 that has an image sensor.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of analyzing images, performed at a computer system in communication with an image acquisition device having an image sensor, the computer system having one or more processors and memory storing one or more programs configured for execution by the one or more processors:

receiving a reference image template, the reference image template including:
  a predefined sync region including one or more distinctive visual features;
  a predefined inspection region located at a predefined offset from the predefined sync region;
acquiring, from the image sensor, a continuous sequence of image frames and storing each of the image frames in a buffer within the memory;
for each image frame in the buffer:
  determining whether the respective image frame includes a respective sub-region matching the predefined sync region;
  in accordance with a determination that the respective image frame includes a respective sub-region having a set of visual features matching the one or more distinctive visual features:
    capturing a respective inspection region, within the respective image frame, at the predefined offset from the respective sub-region; and
    storing the captured respective inspection region to a non-volatile portion of the memory of the computer system, the non-volatile portion of the memory being distinct from the buffer.

2. The method of claim 1, wherein storing the captured respective inspection region to a non-volatile portion of the memory of the computer system includes storing a respective identifier corresponding to the captured respective inspection region.

3. The method of claim 1, further comprising storing the reference image template, including:
  storing a sync region size and a sync region location, wherein the sync region location comprises a first set of coordinates; and
  storing an inspection region size and an inspection region location, wherein the inspection region location comprises a second set of coordinates.

4. The method of claim 1, wherein determining whether the respective image frame includes a respective sub-region matching the predefined sync region includes detecting a frame that includes the one or more distinctive features.

5. The method of claim 1, wherein:
  the predefined sync region is specified by a user; and
  the predefined inspection region is specified by a user.

6. The method of claim 1, wherein the predefined inspection region includes the predefined sync region.

7. The method of claim 1, wherein the predefined sync region is distinct and separate from the predefined inspection region.

8. The method of claim 1, further comprising:
  providing the captured respective inspection region for inspection.

9. The method of claim 1, further comprising:
  performing one or more predefined visual tests on the captured respective inspection region to evaluate whether the respective image frame meets a specified quality standard; and
  reporting results of the one or more predefined visual tests performed on the captured respective inspection region.

10. The method of claim 9, wherein:
  performing the one or more predefined visual tests on the captured respective inspection region includes:
    identifying a feature region for evaluation; and
    determining whether the feature region meets the specified quality standard; and
  reporting results of the predefined visual tests performed on the captured respective inspection region includes providing an indication of whether the feature region meets the specified quality standard.

11. The method of claim 10, wherein the feature region includes a barcode.

12. The method of claim 10, further comprising:
  automatically identifying one or more feature regions, wherein at least one of the one or more feature regions includes a barcode.

13. The method of claim 10, wherein the feature region is a user defined region.

14. A computer system for analyzing images, the computer system being in communication with an image acquisition device having an image sensor and the computer system comprising:
  one or more processors;
  memory; and
  one or more programs stored in the memory and configured for execution by the one or more processors, the one or more programs comprising instructions for:
    receiving a reference image template, the reference image template including:
      a predefined sync region including one or more distinctive visual features; and
      a predefined inspection region located at a predefined offset from the predefined sync region;
    acquiring, from the image sensor, a continuous sequence of image frames and storing each of the image frames in a buffer within the memory;
    for each image frame in the buffer:
      determining whether the respective image frame includes a respective sub-region matching the predefined sync region;
      in accordance with a determination that the respective image frame includes a respective sub-region having a set of visual features matching the one or more distinctive visual features:
        capturing a respective inspection region, within the respective image frame, at the predefined offset from the respective sub-region; and
        storing the captured respective inspection region to a non-volatile portion of the memory of the computer system, the non-volatile portion of the memory being distinct from the buffer.

15. The computer system of claim 14, wherein storing the captured respective inspection region to a non-volatile portion of the memory of the computer system includes storing a respective identifier corresponding to the captured respective inspection region.

16. The computer system of claim 14, wherein the one or more programs further include instructions for storing the reference image template, including:
  storing a sync region size and a sync region location, wherein the sync region location comprises a first set of coordinates; and
  storing an inspection region size and an inspection region location, wherein the inspection region location comprises a second set of coordinates.

17. The computer system of claim 14, wherein determining whether the respective image frame includes a respective sub-region matching the predefined sync region includes:
  detecting a frame that includes the one or more distinctive features.

18. A non-transitory computer readable storage medium storing one or more programs configured for execution by a computer system in communication with an image acquisition device having an image sensor and having one or more processors, memory, and a display, the one or more programs comprising instructions for:
- receiving a reference image template, the reference image template including:
  - a predefined sync region including one or more distinctive visual features; and
  - a predefined inspection region located at a predefined offset from the predefined sync region;
  - acquiring, from the image sensor, a continuous sequence of image frames and storing each of the image frames in a buffer within the memory;
- for each image frame in the buffer:
  - determining whether the respective image frame includes a respective sub-region matching the predefined sync region;
  - in accordance with a determination that the respective image frame includes a respective sub-region having a set of visual features matching the one or more distinctive visual features:
    - capturing a respective inspection region, within the respective image frame, at the predefined offset from the respective sub-region; and
    - storing the captured respective inspection region to a non-volatile portion of the memory of the computer system, the non-volatile portion of the memory being distinct from the buffer.

19. The non-transitory computer readable storage medium of claim 18, wherein storing the captured respective inspection region to a non-volatile portion of the memory of the computer system includes storing a respective identifier corresponding to the captured respective inspection region.

20. The non-transitory computer readable storage medium of claim 18, wherein the one or more programs further include instructions for storing the reference image template, including:
- storing a sync region size and a sync region location, wherein the sync region location comprises a first set of coordinates; and
- storing an inspection region size and an inspection region location, wherein the inspection region location comprises a second set of coordinates.

\* \* \* \* \*